US009449190B2

(12) United States Patent
Centonze et al.

(10) Patent No.: US 9,449,190 B2
(45) Date of Patent: Sep. 20, 2016

(54) METHOD AND SYSTEM FOR RUN-TIME DYNAMIC AND INTERACTIVE IDENTIFICATION SOFTWARE AUTHORIZATION REQUIREMENTS AND PRIVILEGED CODE LOCATIONS, AND FOR VALIDATION OF OTHER SOFTWARE PROGRAM ANALYSIS RESULTS

(75) Inventors: Paolina Centonze, Yorktown Heights, NY (US); Jose Gomes, Douglaston, NY (US); Marco Pistoia, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 900 days.

(21) Appl. No.: 12/127,298

(22) Filed: May 27, 2008

(65) Prior Publication Data

US 2009/0007223 A1 Jan. 1, 2009

Related U.S. Application Data

(63) Continuation of application No. 11/416,839, filed on May 3, 2006, now abandoned.

(51) Int. Cl.
*G06F 21/00* (2013.01)
*G06F 21/62* (2013.01)

(52) U.S. Cl.
CPC ... *G06F 21/6227* (2013.01); *G06F 2221/2141* (2013.01); *G06F 2221/2149* (2013.01)

(58) Field of Classification Search
None
See application file for complete search history.

(56) References Cited

U.S. PATENT DOCUMENTS 5,911,060 A * 6/1999 Elliott ................. G06F 11/1438
707/999.2
5,928,369 A * 7/1999 Keyser ................ G06F 11/0766
714/47.3

(Continued)

OTHER PUBLICATIONS

Tripathi, Anand R.; Ahmed, Tanvir; Kumar, Richa. Specification of Secure Distributed Collaboration Systems. The Sixth International Symposium on Autonomous Decentralized Systems, 2003. ISADS 2003. http://ieeexplore.ieee.org/stamp/stamp.jsp?tp=&arnumber=1193943.*

(Continued)

*Primary Examiner* — Jeremiah Avery
(74) *Attorney, Agent, or Firm* — Scully, Scott, Murphy & Presser, P.C.; Mercedes Hobson, Esq.

(57) ABSTRACT

A system, method and computer program product for identifying security authorizations and privileged-code requirements; for validating analyses performed using static analyses; for automatically evaluating existing security policies; for detecting problems in code; in a run-time execution environment in which a software program is executing. The method comprises: implementing reflection objects for identifying program points in the executing program where authorization failures have occurred in response to the program's attempted access of resources requiring authorization; displaying instances of identified program points via a user interface, the identified instances being user selectable; for a selected program point, determining authorization and privileged-code requirements for the access restricted resources in real-time; and, enabling a user to select, via the user interface, whether a required authorization should be granted, wherein local system, fine-grained access of resources requiring authorizations is provided.

34 Claims, 17 Drawing Sheets

(56) References Cited

U.S. PATENT DOCUMENTS

| | | | | |
|---|---|---|---|---|
| 6,408,336 B1* | 6/2002 | Schneider | ........... | H04L 63/0218 709/229 |
| 6,499,036 B1* | 12/2002 | Gurevich | .............. | G06F 9/4435 707/778 |
| 6,668,325 B1* | 12/2003 | Collberg | ................. | G06F 21/14 713/194 |
| 6,697,824 B1* | 2/2004 | Bowman-Amuah | ......... | 709/229 |
| 7,051,366 B1* | 5/2006 | LaMacchia et al. | ............. | 726/14 |
| 7,073,059 B2* | 7/2006 | Worely, Jr. | ............ | G06F 9/4812 713/164 |
| 7,174,320 B2* | 2/2007 | Rothrock | ................ | G06F 21/10 705/57 |
| 7,207,064 B2* | 4/2007 | Fee et al. | ......................... | 726/14 |
| 7,207,065 B2* | 4/2007 | Chess | ................ | G06F 11/3612 726/22 |
| 7,272,815 B1* | 9/2007 | Eldridge | ................... | G06F 8/71 707/999.009 |
| 7,349,912 B2* | 3/2008 | Delany | ................... | G06F 21/41 707/694 |
| 7,681,226 B2* | 3/2010 | Kraemer | ................. | G06F 21/53 713/2 |
| 2002/0138763 A1* | 9/2002 | Delany | ................... | G06F 21/41 726/6 |
| 2004/0210500 A1* | 10/2004 | Sobel | ..................... | G06Q 40/00 705/35 |

OTHER PUBLICATIONS

Qi, Lin; Yu, Lu. Mobile Agent-Based Security Model for Distributed System. 2001 IEEE International Conference on Systems, Man, and Cybernetics. vol. 3. http://ieeexplore.ieee.org/stamp/stamp.jsp?tp=&arnumber=973539.*

Jerome H. Saltzer and Michael D. Schroeder, "The Protection of Information in Computer Systems," in Proceedings of the IEEE, vol. 63, pp. 1278-1308, Sep. 1975.

Koved, Pistoia, Kershenbaum. *Access Rights Analysis for Java.* OOPSLA 2002, Seattle, Nov. 2002.

Pistoia, Flynn, Koved, and Sreedhar. Interprocedural Analysis for Privileged Code Placement and Tainted Variable Detection. ECOOP 2005, Glasgow, Scotland, UK, Jul. 2005.

* cited by examiner

METHOD AND SYSTEM FOR RUN-TIME DYNAMIC AND INTERACTIVE IDENTIFICATION SOFTWARE AUTHORIZATION REQUIREMENTS AND PRIVILEGED CODE LOCATIONS, AND FOR VALIDATION OF OTHER SOFTWARE PROGRAM ANALYSIS RESULTS

CROSS REFERENCE TO RELATED APPLICATION

This application is a continuation of U.S. application Ser. No. 11/416,839 filed May 3, 2006, the entire contents of which are incorporated herein by reference.

FIELD OF THE INVENTION

This invention relates generally to the field of data and operation security and authorizing access to software programs, and particularly, to a system and method for automating the dynamic identification of authorization requirements of software programs, in a manner that protects the integrity of the system on which the identification is performed. Furthermore, this invention describes how to dynamically determine locations of library code that are candidates to become privileged. Additionally, this invention can be used to validate the results obtained by performing other analysis on code, including static analysis and code inspection.

BACKGROUND OF THE INVENTION

Modern computer run-time environments providing a fundamental set of services that all programs can use such as Java Standard Edition (Java SE) and Microsoft .NET Common Language Runtime (CLR), have adopted a form of access control based on stack inspection. When security is enabled, all security-sensitive resources are, by default, access restricted. Such resources include the file system, network, operating system, printers, etc. When access to a restricted resource is attempted, a particular security function is invoked by the underlying security system. For example, in Java SE, this function is called checkPermission( ), and in CLR, Demand( ). Both these functions take an object as a parameter that represents the access being attempted. For example, in Java SE, this object is of type Permission (of one of its subclasses) and in CLR this object is of type IPermission. The purpose of the functions is to traverse the stack of execution and verify that all the classes of all the methods on the stack have been granted the necessary authorization. If just one of the callers on the stack cannot exhibit the appropriate authorization, an Exception is thrown and access to the requested resource is denied to all the callers on the stack.

FIG. 4A shows a conventional stack inspection process 99 in Java SE, when the constructor of FileOutputStream is invoked. In the scenario of a stack inspection process 99 depicted in FIG. 4A, it is assumed that the main( ) method of a Client application invokes the FileOutputStream constructor to access file log.txt in write mode. The FileOutputStream constructor calls the checkWrite( ) method of the current SecurityManager ("sm"), passing to it the name of the file being accessed. The SecurityManager instance, sm, calls the checkPermission( ) method on sm with a Permission p of type FilePermission representing the right to access file log.txt in write mode. The checkPermission( ) method on sm, in turn, calls the static method AccessController.check-Permission( ) with the same parameter, p. This function performs the stack traversal backwards, verifying that all the callers on the stack (AccessController, SecurityManager, FileOutputStream, and Client) have been granted Permission "p" (or a Permission stronger than p, for example the FilePermission to read and write all the files of the file system).

This architecture guarantees that if access to a protected resource succeeds, no untrusted code can be on the stack. This is particularly useful in systems where programs are collections of components, such as libraries, plug-ins, etc., (for example, Java Archive (JAR) files in Java SE or assembly files in CLR). In such systems, different components with different levels of trust may be assembled together, so it is important to ensure that untrusted components do not get unintended privileges.

Typically, permissions are fine grained. For example, for a Java SE FilePermission, it is possible to specify the name of the file(s) and the mode(s) of access (read, write, execute, and delete). Permissions are granted declaratively in an external policy file so that a computer programmer is not required to hardcode access control in a program.

Sometimes, trusted library code may need to perform certain operations that its callers did not explicitly request. For example, a library may exhibit a method, createSocket( ), responsible for constructing Sockets and returning them to its client programs. It makes sense to expect those client programs to be authorized with a SocketPermission. However, for auditing purposes, the library developer may have chosen to embed code in createSocket( ) that logs the Socket creation operation to a file. In this case, the library's client programs will need a FilePermission too. Since the purpose of createSocket( ) is to create a Socket, granting client programs the FilePermission to write to the log file would be a violation of the so called "Principle of Least Privilege" (see Jerome H. Saltzer and Michael D. Schroeder, "The Protection of Information in Computer Systems," in Proceedings of the IEEE, Volume 63, Pages 1278-1308, September 1975). To prevent system administrators from needing to authorize client programs when a permission requirement is caused by a library, the portion of library code responsible for performing the operation not explicitly requested by the client can be made "privileged." For example, in Java SE, making code privileged requires wrapping it into a call to doPrivileged( ) (see FIG. 4B); in CLR, it requires wrapping that code into a call to Assert( ). When authorization checks are performed, privileged code causes the stack inspection mechanism to interrupt at the library level. The end result is that client programs invoking that library will not be required to possess the permission to perform the operation executed in the library's privileged code.

This is particularly depicted in FIG. 4B which illustrates how client code, Client.main( ), invokes LibraryCode.createSocket( ) for the purpose of getting a socket connection to a remote system. When LibraryCode.createSocket( ) constructs the Socket, a stack 197 is generated that causes an authorization check. All the callers will need to prove possession of the necessary SocketPermission. However, in the example depicted, this library code has been programmed so that, as soon as the Socket has been created, the Socket creation is logged to a file. A new stack 198 is generated and all the callers on the stack will now have to prove possession of the necessary FilePermission. Fortunately, the developer has added a call 199 to doPrivileged( ), which stops the stack inspection at the frame just above doPrivileged( ). This way, the client code is exempted from proving possession of the FilePermission, and, consequently, the client code will not have to be granted any FilePermission to write to the log file log.txt. If the client had to be granted such permission, the client could misuse it and overwrite the log file. Since the library calls doPrivileged( ), it is not necessary for the client to have that FilePermission, and the client will not be able to misuse that permission.

Another form of access control adopted by modern computing systems is Role-Based Access Control (RBAC). For example, Java Enterprise Edition (Java EE) and CLR have adopted RBAC to restrict access to security-sensitive resources. In RBAC, restrictions are enforced on the operations performed by the code rather than the data manipulated by the code. A role is a semantic grouping of rights to access rights. Users of a RBAC system are assigned roles. When a user attempts to perform a restricted operation on an RBAC system, that user must have been authenticated and must show possessions of the roles necessary to perform that operation. Typically, the roles assigned to a user are propagated throughout the execution of the code. Therefore, stack inspection in these systems is not strictly necessary, since the roles granted to the executing user are immediately available to the underlying for verification, and there is no need to traverse the stack backwards. When access to a restricted operation is attempted, the underlying system verifies that the roles granted to the user are sufficient to perform that operation. Roles are typically granted declaratively in an external deployment descriptor file. This way, system administrators can configure access control of applications without the need for hardcoded access control.

Even though access control based on stack inspection and/or roles is very sophisticated, it is also very difficult to configure. Given a large and complex program, it becomes almost impossible to understand what permissions and/or roles are required before run time. Similarly, it is also very difficult to understand what portions of library code should be made privileged. The three approaches commonly used are:

1) Manual code inspection. This approach is extremely expensive and error prone. For large programs, this approach is discouraged. Additionally, the source code of the program may not be available (the compiled code could have been purchased from a third party or it could have been machine-generated), so this approach may not even be feasible;

2) Dynamic analysis or testing. This approach consists of writing or generating test cases that make calls into the target program. During testing, the system component responsible for enforcing security must be active. For example, in Java SE, there must be an active SecurityManager (which can be installed by specifying the -Djava.security.manager flag on the command line or by calling System.setSecurityManager (new SecurityManager( )) from within the program). The untrusted libraries or components should be granted no permissions. The trusted libraries should be granted AllPermission. At this point, executing a test case will generate security Exceptions every time access to a protected resource is attempted while untrusted code is on the stack. The tester is supposed to log each of these Exceptions, understand what permission is missing, decide whether it is appropriate to grant that permission, and, if yes, manually add that permission to the policy file (which is also a difficult operation since policy files have a complicated syntax, and a simple typo can make the entire policy not valid). If the code being tested is library code, it is also necessary to decide, for each missing permission, whether it is appropriate to require that client programs invoking that library be granted that permission or if it is more appropriate to make the portion of library code generating the permission requirement privileged. After a decision has been made, a new test case must be written and the same sequence of operations repeated until no security Exceptions are discovered. However, this process is tedious, time consuming, and error prone due to the following:

It is necessary to write or generate one or more test cases that cover each program entry point;
  Additionally, a set of test cases is not guaranteed to be complete. Therefore, authorization requirements may remain undiscovered until run time;
  For each Exception, it is necessary to inspect the stack trace, understand why the Exception was thrown, and identify where the permission was missing. If a permission should be granted, then it is also necessary to manually edit the policy file; and,
  After an Exception has been processed (either by granting the required permission or by ignoring the permission requirement), it is necessary to restart the program.

Typically, each security Exception generated during testing can terminate the program. It is therefore necessary to restart the program every time, and for complex program, it may be quite time consuming to bring them to a certain desired state where the testing can continue.

Additionally, dynamic analysis is potentially unsound, meaning that it may miss some authorization or privileged-code requirements because there may be paths of execution that may remain undiscovered during testing. For example, a particular path of execution for an application may become feasible only upon passing a certain parameter to one of the application's entry points. If that parameter is not passed to the application during testing, the corresponding path of execution may remain undiscovered until run time. Other errors might be performed while editing the policy file.

Static analysis. This approach consists of using a tool that models the execution of a program without running the program itself. From the model, it is possible to infer the program's authorization requirements (see Koved, Pistoia, Kershenbaum. *Access Rights Analysis for Java*. OOPSLA 2002, Seattle, November 2002) and the privileged code requirements (see Pistoia, Flynn, Koved, and Sreedhar. Interprocedural Analysis for Privileged Code Placement and Tainted Variable Detection. ECOOP 2005, Glasgow, Scotland, UK, July 2005). However, this approach too has some limitations:

Since static models must be very complex in order to report precise results, a static analysis tool may not scale to large programs.
  Static analysis is conservative, which means that it may find authorization and privileged code requirements that are not real. Reasons for conservativeness include: path insensitivity, flow insensitivity, context insensitivity, etc. It can be mathematically proved that conservativeness cannot be completely removed.
  Static analysis is not supposed to be unsound, but in reality it often is. For example, static analyzers for Java are able to analyze Java programs, but if a Java program causes (directly or indirectly) the execution of native methods (written in another language) or reflection, the analyzer typically does not show the control and data flows from the native methods. The model is incomplete and therefore, unsound.
  Static analysis may require a very long time to complete (even days if fairly precise results are required).

It is clear that none of these solutions alone is sufficient to completely determine the authorization requirements of a program.

It would be highly desirable to provide a system and method that performs automatic run-time discovery of authorization requirements.

BRIEF SUMMARY OF THE INVENTION

The present invention is directed to a run-time, dynamic, automated, interactive, and secure authorization-requirement and privileged-code-placement discovery system, method, and apparatus that allows users to automatically: a) discover the security-sensitive actions attempted by a program; b) detect the program's authorization requirements; c) identify portions of library code that should be made privileged; and d) configure and inspect the security policy of the program. The run-time authorization-requirement and privileged-code-placement discovery operations are performed without having to: write or generate test cases; manually edit the policy database; compromise the integrity of the underlying computer; or restart the application at every security Exception, permission-requirement finding, privileged-code-placement finding, or policy change.

Particularly, a system, method and computer program product for automatic identification of authorization requirements of software programs and for validation of other analysis results (such as results obtained from static analysis, code inspection, etc.) is provided with functionality such as: 1) executing the program in a restricted environment by default, which guarantees that the program will not harm the underlying computer software or hardware in any way; 2) allowing the user to select which methods in the program should be executed, without the need for writing or generating test cases; 3) automatically configuring access control (if the user has a level of trust in the program, the user can choose which authorizations should be granted to the program and which should not based on the authorization requirements progressively discovered by the system); 4) enabling interactive authorization-requirement discovery and configuration; 5) detecting authorization requirements that may be generated by side effects of method invocations; 6) enabling a user to inspect the security configuration of the program at any time; 7) supporting component-based programs, with each component potentially being granted different permissions; 8) permitting automatic modification of the program's security policy (no manual editing is required); 9) permitting user inspection of the program's code origin (for example, the network location from which the code is coming as well as the certificate of the code providers, if those code providers digitally signed that code) and the access rights already granted to the program; 10) precisely identifying the program points (component name, class name, method name, file name, and line number) where a permission is missing and/or a privileged code instruction should be inserted; 11) precisely identifying what other permissions have already been granted to the program's code; 12) enabling inspecting the entire stack trace in a GUI and displays where in the stack trace the permission is missing; 13) obviating the need to stop the program when a permission is missing; 14) preventing denial of service attacks (which can cause a system to stop working) from happening; 15) providing a non-conservative system (if the system reports that a permission or a piece of privileged code is required, that permission or piece of privileged code is really required); 16) updating and reapplying the security policy at any change performed by the user without the need of restarting the program; 17) facilitating the security configuration by providing a graphical user interface; 18) performing immediate detecting of a missing permission; 19) displaying the security history of the program under analysis (important for methods that take parameters since it allows inspecting the different authorization and privileged-code requirements based on the different values passed); 20) allowing detection of the different permission requirements that can arise when invoking methods with different parameters; 21) allowing for the automatic discovery of the security-sensitive actions attempted by a program; 22) allowing automatic inspection of the stack trace every time a problem occurs in the program and an Exception is raised (not just security Exceptions); and 23) validating results obtained by executing other analyses (such as static analysis and code inspection) on the program.

It is understood that the system and method of the invention does not depend on the particular security subsystem. If the security subsystem configuration changes, for example as a result of having installed a different implementation of the access control enforcer (checkPermission( ) in Java SE or Demand( ) in CLR), authorization requirements will changes accordingly, but no change is required to this invention to detect the new authorization requirements.

It is also understood that the present invention is not limited by the mechanism in systems that enforce access control. For example, the present invention can detect authorization and privileged-code requirements in systems that enforce access control regardless of whether or not the authorization mechanism is based stack-inspection, RBAC, or a different mechanism. Conversely, static analysis tools for authorization and privileged-code requirements need to be built based on the specific run-time authorization mechanism.

Moreover, it is understood that this invention has a scope broader than just authorization and privileged-code requirement detection. In fact, it can be used to automatically identify general problems in code (such as NullPointerExceptions) and to validate results obtained by executing static analysis on that code. For example, this invention can be used to identify the false alarms reported by a static analyzer and, more in general, this invention can be used as a debugging tool.

Thus, according to the invention, there is provided a system, method and computer program product for detecting security-permission, security-role, and privileged-code requirements in a run-time execution environment in which a software program is executing, the system comprising:

a mechanism for identifying program points in the executing program where authorization failures have occurred in response to the program's attempted access of resources requiring permissions or roles as enforced by an underlying security subsystem;

a user interface for displaying instances of identified program points, the identified instances being user selectable;

a mechanism for associating each selected program point to the permissions or roles required to access that selected program point at run-time;

a mechanism for detecting the program points that should be made privileged to prevent client code from having to exhibit unnecessary permissions or roles; and a mechanism for enabling a user to select, via the user interface, whether a required permission or role should be granted.

There is further provided a mechanism for identifying problems in code, such as Exceptions raised by code.

Preferably, the method of this invention is provided independent of the particular security subsystem implemented.

In further aspects of the invention, a program point includes one or more of: a program component, a class, a method, a file name, and a line number.

Moreover, the reflection mechanism performs functions including, but not limited to: enabling instantiation of selected objects of the program; and enabling determination of all methods and constructors capable of being invoked for objects and classes of the program. These determined methods are displayed for user selection via the user interface.

In another embodiment of the invention, there is provided a run-time authorization requirement discovery tool for a computing device executing software programs requiring security permissions or roles, the tool comprising:

means providing an execution environment enabling automatic discovery of security-sensitive actions attempted by an executing program, the means enabling execution of program points in the executing program where authorization and privileged-code requirements may arise in response to the program's attempt to access resources requiring permissions as enforced by a particular security subsystem;

means for displaying instances of identified program points via a user interface;

means enabling user selection of a displayed program point via the interface; and, means for determining the permissions or roles required to access the restricted resources associated with the selected program point in real-time, the user being enabled to select, via the user interface, whether a required permission should be granted, wherein local system, fine-grained access of resources requiring permissions is provided.

In accordance with this aspect of the invention, the system allows the user to select which methods in the program should be executed, without the need for writing or generating test cases.

In a further aspect of the invention, there is provided a system and method for providing real-time software authorization access to restricted resources by a computer program, the system comprising:

means for enabling program execution in a restricted execution environment;

means for determining one or more program points of said executing program;

means for selecting a program point;

means for initiating the execution of a selected program point without causing the system to stop its own execution if one or more authorizations are missing or one or more required privileged code calls are missing;

means enabling a user to inspect, via a display device, a stack trace generated in response to said selected program point, said stack trace provided via said display means to indicate required authorizations or other problems in code;

means enabling a user to inspect, via a display device, the current security configuration of the run-time environment and the program being inspected;

means enabling a user to grant, via said display means, one or more said required authorizations, wherein said granting of permissions or roles is performed without terminating execution of the program; and means enabling a user to detect, via said display means, the optimal locations where privileged code should be inserted to prevent client code from having to be granted unnecessary and unrequested authorizations, where "optimal" means closer to the authorization check, each location comprising the component name, class name, method name, file name, and line number.

Further to these aspects of the invention, the system and methods of the invention generates for display information about the code having the missing authorization, the information comprising: the fully-qualified characterization of the permission or role requirement, a URL from which the code requiring the permission is originated, the certificates of entities that signed that code, the specific code location requiring the authorization, the security-sensitive operation being attempted, and the program permissions already granted to the code component.

Moreover, further to the system and method of the invention, there is provided a means for automatically updating a security policy in response to a user granting a particular authorization without the need for restarting execution of the program.

In a further aspect of the invention, there is provided a system, method and computer program product for detecting problems in an executing software program comprising:

enabling program execution in a restricted execution environment;

determining one or more program points of the executing program wherein all exception is raised indicating a potential problem in the executing software;

selecting a program point;

initiating the execution of a selected program point without causing the system to stop its own execution if an exception is raised indicating a problem with the software;

enabling a user to inspect, via a display device, a stack trace generated in response to the selected program point, the stack trace provided via the display means to indicate the raised exception for the potential problem in the executing software; and means enabling a user to detect, via the display means, the optimal locations where code may be inserted to correct the indicated problem.

Moreover, there is further provided a system, method and computer program product for verifying analysis results of software programs, the analysis results being obtained as a result of a previously performed software analysis technique, the method comprising:

enabling program execution in a restricted execution environment, which prevents the underlying system from becoming corrupted in case the program being executed is malicious or performs incorrectly;

determining from the previously obtained analysis results, one or more program points of the executing program indicating a potential problem in the software program;

selecting a program point;

initiating the execution of a selected program point without causing the system to stop its own execution if an exception is raised indicating the potential problem with the software;

enabling a user to inspect, via a display device, a stack trace generated in response to the selected program point, the stack trace provided via the display means to indicate the problem in the executing software; and enabling a user to verify, via the display means, whether the potential problem was correctly indicated by the previously performed software analysis technique.

Further to this aspect of the invention, the previously performed software analysis technique comprises a static analysis performed by a static analysis tool for detecting problems in the program, or an analysis performed by a user inspecting said software for detecting a problem in the program.

Advantageously, the present invention can be applied to any software security system enforcing access control, particularly software security systems based on stack inspection, Role-Based Access Control (RBAC) systems, software security systems enforcing access-control restrictions on data, and software security systems enforcing access on operations.

BRIEF DESCRIPTION OF THE DRAWINGS

These and other objects, features and advantages of the present invention will become apparent from the following detailed description of illustrative embodiments thereof, which is to be read in connection with the accompanying drawings, in which:

FIGS. 5A-5L depict example user interface displays generated by the run-time authorization requirement discovery tool according to the invention.

DETAILED DESCRIPTION OF THE INVENTION

Figure 1:
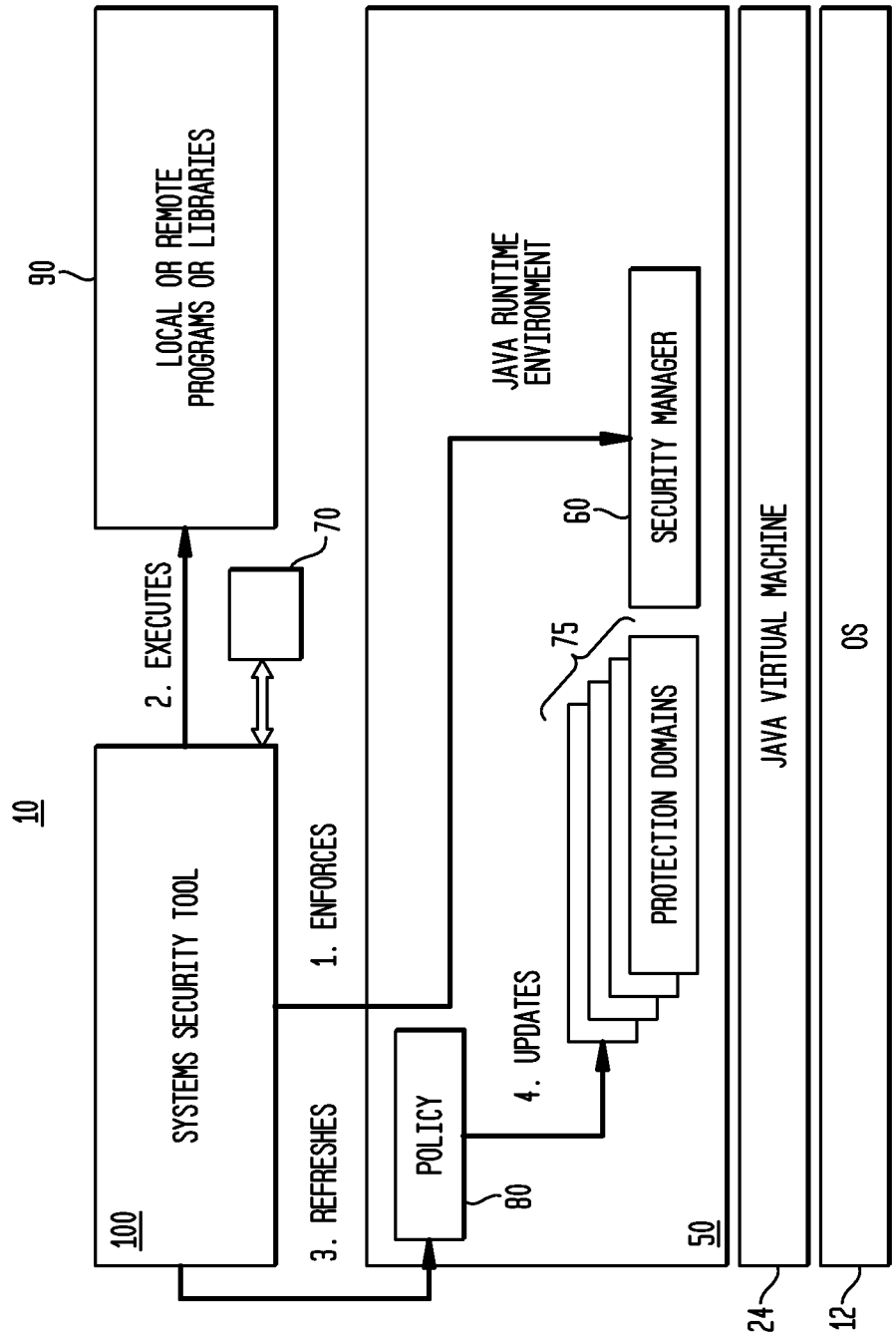
FIG. 1 illustrates the computing system 10 in which the system security tool 100 of the present invention operates.

The invention is directed to a run-time authorization requirement discovery tool that allows users to automatically: a) discover the security-sensitive actions attempted by a program; b) detect the program's authorization requirements; c) detect a program's privileged-code requirements; and d) configure and inspect the security policy of the program.

The automated run-time authorization and privileged-code requirement discovery tool is enabled by using reflection, a technology that allows automatically inspecting compiled code, creating objects, and invoking methods on objects and classes. The program components being analyzed are isolated from the rest of the invention implementation code as well as from the trusted libraries. This allows customizing the level of trust of the program under analysis without having to change the security configuration of other components.

Aspects of the invention will be described with reference to FIG. 1, which illustrates the computing system 10 in which the system security tool 100 of the present invention operates. Included in the system 10 (e.g., a personal computer, a mobile computing device, a server, e.g., a Web Server) is an Operating System 12, memory, and processor for executing a Java™ Virtual Machine (JVM) 24 or, like platform-independent computing system that implements a JVM that provides a Java™ Runtime Environment (JRE). The JVM provides the Java™ Run Time environment 50 in which a Security Manager object 60 is instantiated by the system security tool 100 of the invention that performs run-time access controls on attempts to perform any security-sensitive operation, such as file I/O, network I/O, creation of a new ClassLoader, manipulation of Threads/ThreadGroups, starting processes on the underlying operating system, terminating the JVM, loading non-Java™ libraries (native code) into the JVM, performing certain types of windowing system operations, changing the configuration of the JVM or of the underlying Operating System, and loading certain types of classes into the JVM. For example, the Java™ applet sandbox, a function of the SecurityManager, severely constrains untrusted applets to a limited set of functions that are considered to be safe. Particularly, in an example implementation of the invention as will be described in greater detail herein, a security manager instance sm 60 obtained by calling the constructor of the SecurityManager class or one of its subclasses, and by then making it the active security manager of the system by calling System.setSecurityManager(sm) is invoked by the system security tool 100 to enforce the run-time authorization requirement and privileged-code requirement discovery for local or remote programs or libraries 90. Security tool 100 of the invention enforces the system's active security manager object 60 yet operates independently of the underlying security system implemented. It is understood that any SecurityManager implementation will work with this invention regardless of which resources that SecurityManager implementation restricts access to and the way access is restricted.

As shown in FIG. 1, the system security tool 100 allows fine-grained access-control configuration via a display interface 70. The security manager object 60, by default, denies access to all the system resources it protects. However, it is possible to specify in detail what the code is allowed to do based on one or more of the following: the URL location from which the code is coming; the signers of the code; and the identity of the user running the code using Java Authentication and Authorization Service (JAAS). Permissions are granted declaratively in a storage media capable of storing the policy. By default, a policy is stored in a flat-file-based policy database called the policy file 80. With respect to the signers of the code, it is understood that multiple signers are allowed and the JVM verifies the signatures transparently. The policy code 80 includes one or more protection domains 75, each protection domain encapsulating a code source, a permission collection, and a (possibly empty) array of Principal objects. The code source inside each protection domain encloses a URL object representing the network location from which the code is coming and an array of Certificate objects, each Certificate object representing the identity of a code digital signer. The permission collection encapsulated in the protection domain represents all the access rights already granted to the code based on the code source. The array of Principal objects correspond to the authentication information of the user or service executing the code (assuming that the user or service has authenticated). Class loader instances are designed to associate a protection domain 75 with each loaded class.

Thus, it is seen from FIG. 1 how the present invention is implemented within the Java SE access control model.

The system security tool 100 of the invention implements reflection, a technology that allows users to automatically inspect compiled code, create objects, and invoke methods on objects and classes. The system implements reflection techniques enabling it to instantiate any new object. More particularly, using the CLASS FACTORY object, an object's class is loaded (using reflection) to detect that class' constructors, and reflection is again used to invoke any of those constructors, as selected by the user. Thus, users are enabled to create objects. Therefore, using the CLASS FACTORY object, a user is enabled to create those objects that may be needed to be passed as parameters to method invocations.

Figure 2:
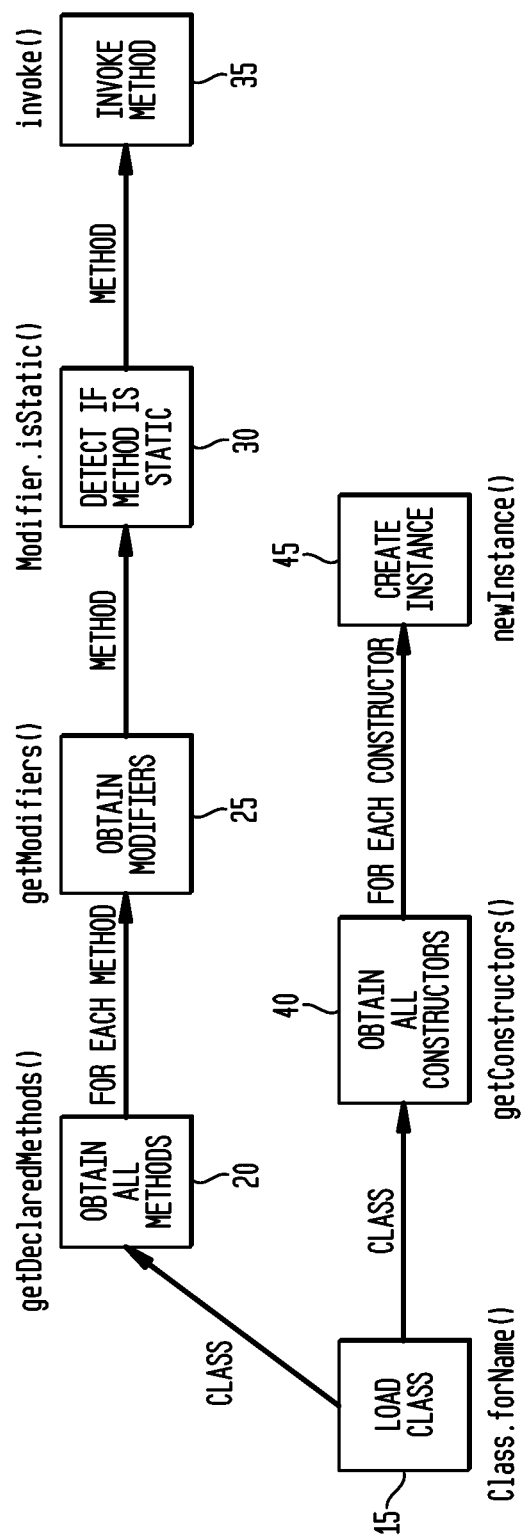
FIG. 2 depicts generally the reflection techniques performed as a result of using the Class Factory object to instantiate other objects through reflection.

FIG. 2 shows how to load and inspect classes and invoke, on those classes, methods that do not require to be invoked on explicit objects, but can be invoked directly on the classes. Such methods are static methods and constructors. Specifically, FIG. 2 depicts the results of instantiating the CLASS FACTORY reflection object. After loading a class 15 using the Class.forName( ) method, reflection method getDeclaredMethods( ) may be invoked to obtain all methods 20 of the executing code (methods of the program under analysis). Further, for each method m detected, the getModifiers( ) reflection method is invoked to obtain all modifiers of m 25. Then, the Modifier.isStatic( ) reflection method is capable of being invoked to determine if m is a static method 30. Finally, m can be invoked (by calling invoke( ) on the corresponding Method object) 35. Alternately, or in addition, the getConstructors( ) reflection method may further be employed to obtain all constructors of the loaded class 40, and for each constructor, a new object instance is created by invoking the newInstance( ) reflection object 45 on the corresponding Constructor object.

Figure 3:
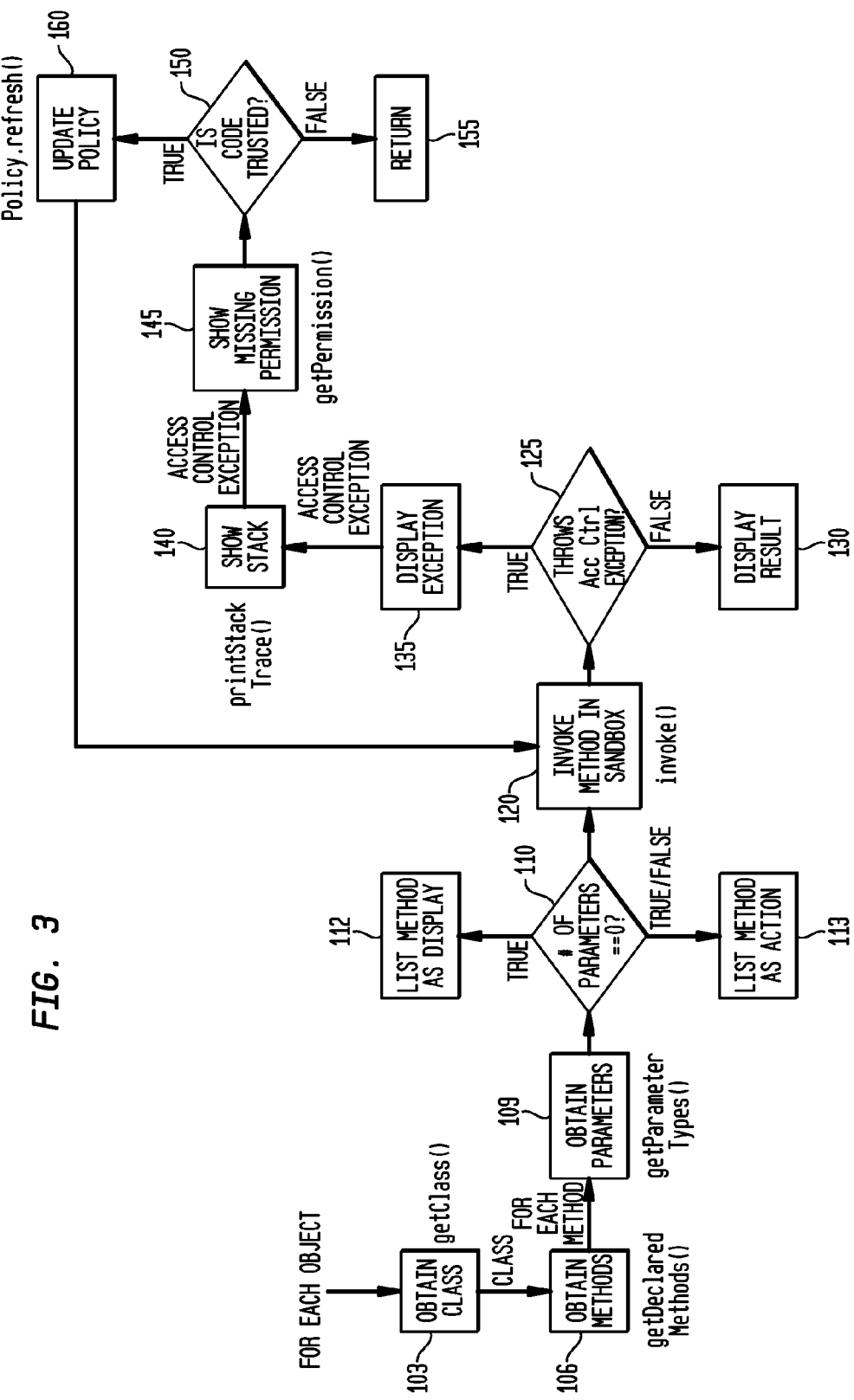
FIG. 3 depicts the reflection and security access control techniques that can be used for every object in the program components being analyzed.
Figure 5A:
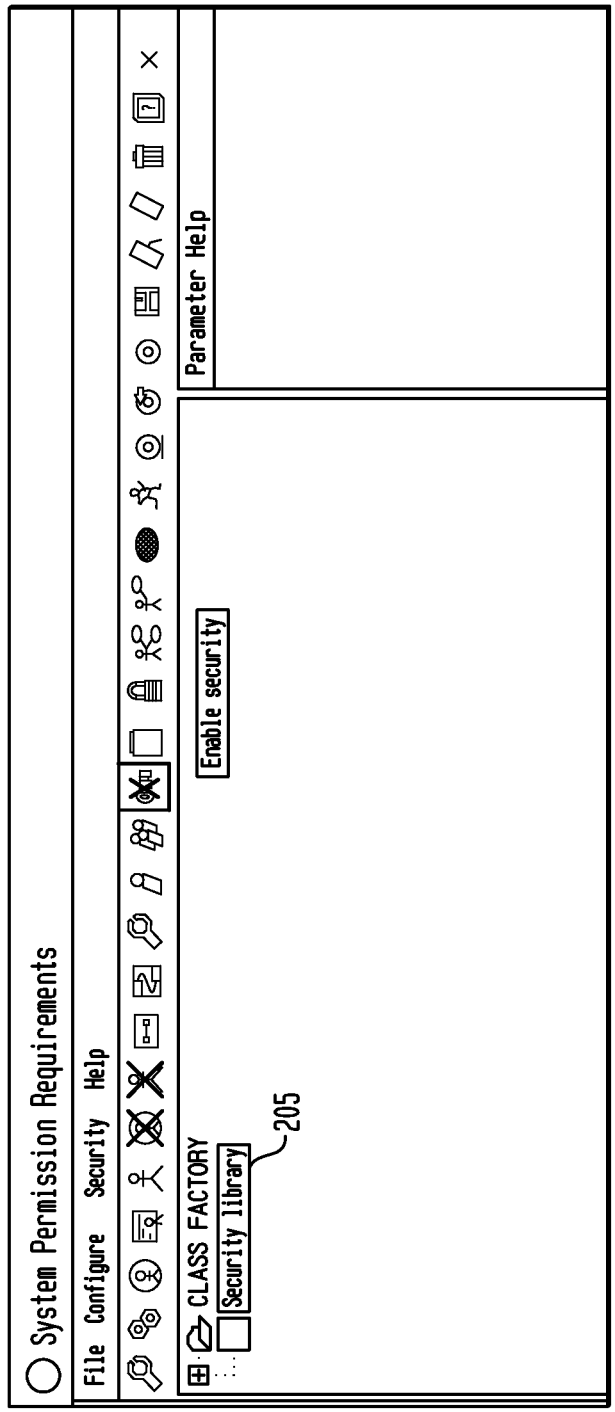

FIG. 3 depicts the reflection and security access control techniques that can be used for every object in the program components being analyzed. As shown in first step 103, the method getClass( ) is invoked to obtain the object's class. In the example scenario depicted in the exemplary display screen interface 200 shown in FIG. 5A, an object 205 of class SecurityLibrary is shown highlighted, although it is understood that the invention is applicable for run-time authorization and privileged-code requirement determination for any Application Programming Interface, including a component-based program, a Java application, a Service Oriented Architecture (SOA) program, a C application, a Microsoft .NET Common Language Runtime (CLR) application, an application developed using a scripting language, or a Web service program. To enable the security features of the invention, after obtaining the class, via the display interface, a user may initiate automatic detection of all of the selected class's methods of interest which may be further selected for automatic testing. Referring back to FIG. 3, at step 106, the system invokes the getDeclaredMethods( ) reflection method that generates all the methods defined in the class. For each method m, a getParameterTypes( ) reflection method is then invoked at 109 to obtain the types and number of the parameters that need to be passed to m. Depending upon the number of parameters detected, the system is caused to generate for display a list of all of the "display methods," i.e., those methods that are easier to invoke because they take no parameters, or, "action methods," which are more complicated to invoke because they may take multiple parameters, which may need to be constructed.

Figure 5B:
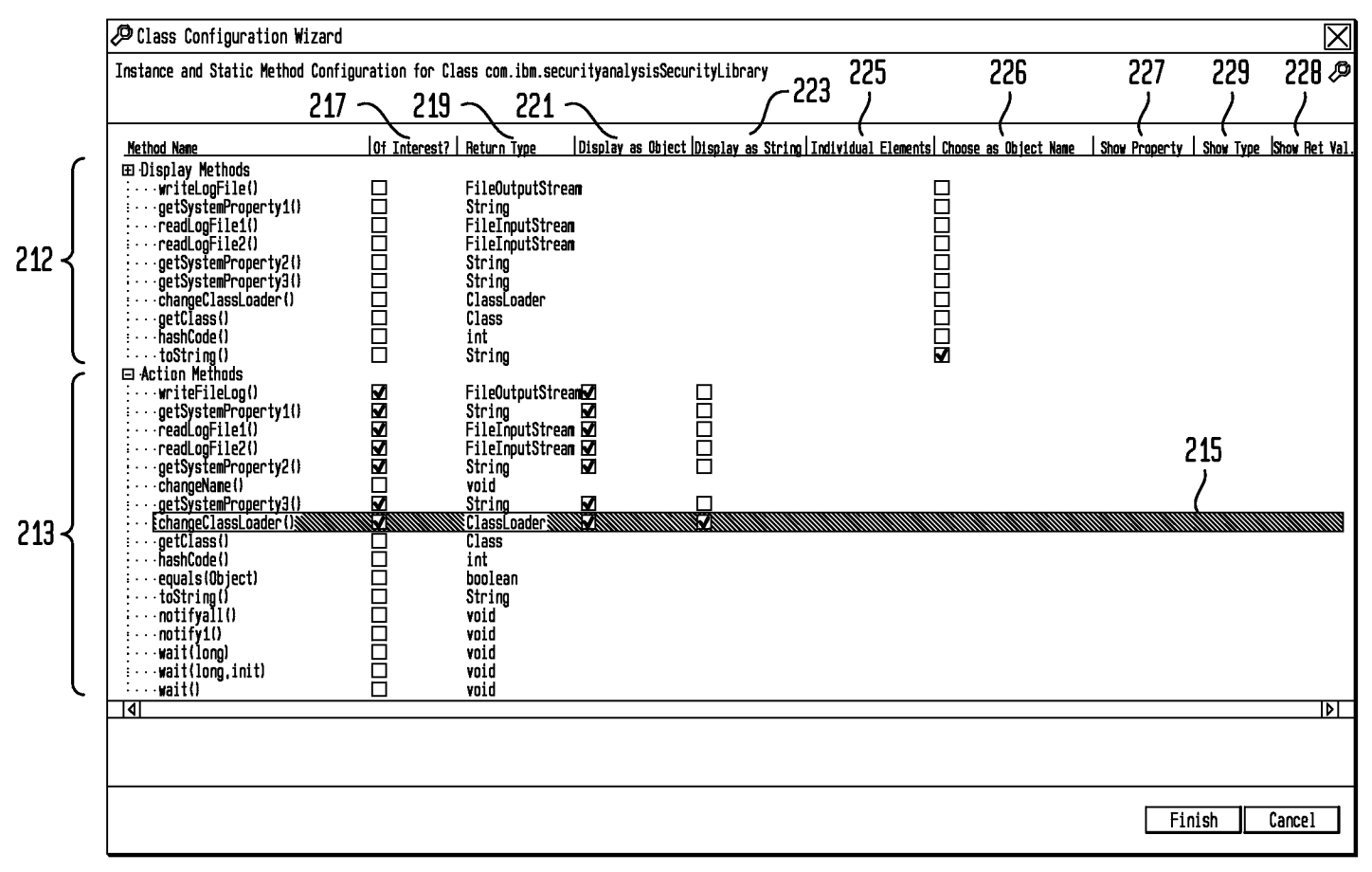

FIG. 5B depicts a screen interface 210 providing an exemplary display generated when obtaining the method classes for the example SecurityLibrary class depicted including a listing of display methods 212, which require no parameters as determined at steps 110, 112, FIG. 3, and/or a listing of action methods 213, which may require multiple parameters, as determined at steps 110, 113, FIG. 3. Thus, according to the invention, given a class, any of its methods/ procedures that are of interest and that can be invoked are automatically detected and can be selected for automatic testing, without having to write a test case. FIG. 5B is illustrative of the interactive nature of the present invention whereby a user is enabled to select a detected method of interest, e.g., by selecting one or more boxes 217 associated with the methods as shown in FIG. 5B. Furthermore, the method of the invention includes the ability to display the method's return type 219. In addition, the method of the invention offers the user the ability to choose characteristics of the methods' return values that will be displayed. For each method, it is possible to display its return value: as an object 221, as a string 223, or as individual elements (for arrays and collections) 225. Furthermore, it is possible to choose the return value of an object's method as the name of that object by selecting an appropriate box 226. It is additionally possible to choose what to display about the return value of a method choosing a combination of the method name (called "property") 227, the return type 229, and the value itself 228, all via interface display 210. In FIG. 5B, an example Action method changeClassLoader( ) 215 is shown highlighted via the exemplary screen interface 210 to enable further drilling down to the authorization requirements of the chosen method/class.

According to the invention, the program components being analyzed are isolated from the rest of the invention implementation code as well as from the underlying libraries. This allows customizing the level of trust of the program under analysis without having to change the security configuration of other components. Thus, returning to FIG. 3, there is depicted the further step of implementing reflection method invoke( ) 120 which enables the invocation of the selected method highlighted via the display interface 210 (shown in FIG. 5B). The system of this invention allows invoking methods of the program under analysis executed in a "sandbox" environment (the program is not allowed to perform security-sensitive operations unless it is explicitly granted the necessary permissions). As known, a sandboxing tool may be implemented that allows a user to control and isolate parts of the execution of a running process with each isolated portion given the illusion that it is interacting with a full system, while in fact, it is confined to a restricted environment where only limited resources can be accessed. If any of the methods being invoked attempts to perform an operation that requires a permission (or a role in a RBAC system) that has not been granted, a SecurityException is generated. Thus, returning to step 125, FIG. 3, after invoking the selected method via reflection, a determination is made as to whether an access control exception is thrown, i.e., a required permission is missing. As will be explained in greater detail herein, and referring to FIG. 3, the system catches the Exception and either displays the result (if no access control exception is thrown) at step 130, or, displays the access control exception that is thrown at step 135. When a thrown exception is caught, the system reports via the interface: 1) What operation was attempted; 2) All the callers on the stack; 3) Which stack frames do not have the required permission; and, 4) Precise information about the code that has not been granted the permission (component name, class name, method name, line number, code origin, and permissions already granted).

Figure 5C:
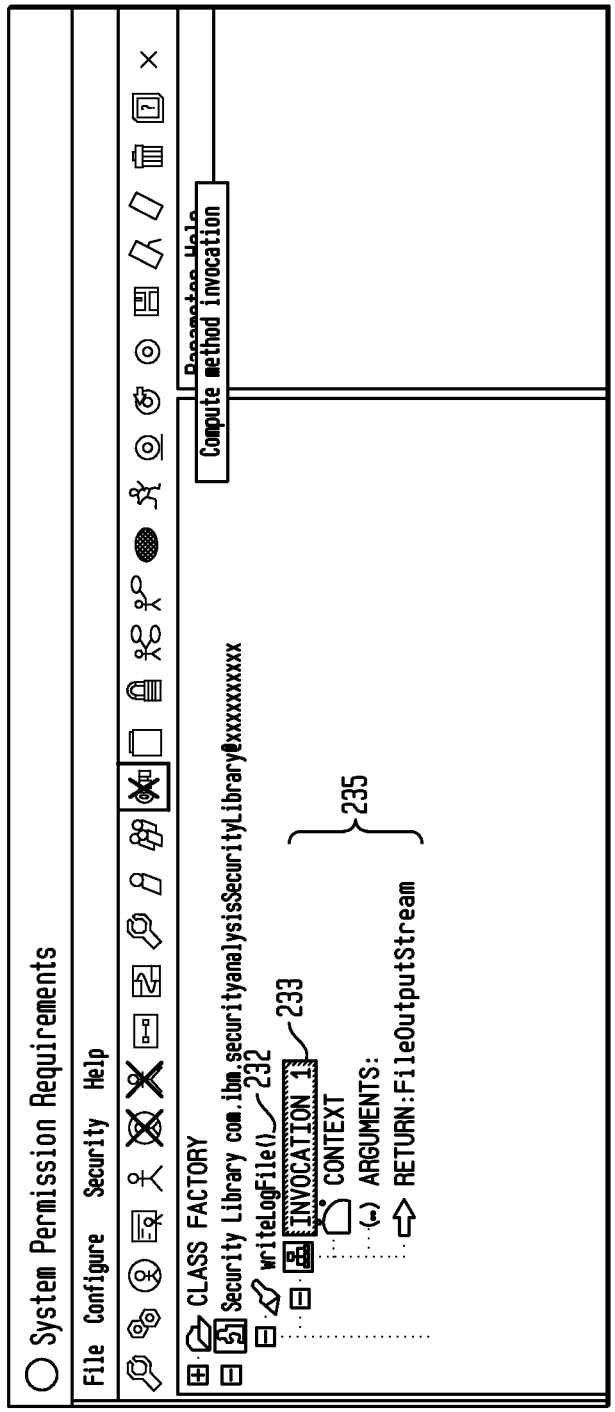

As a result of selecting a method from the interface 210 of FIG. 5B, a resulting display is shown via the example GUI 230 depicted in FIG. 5C. FIG. 5C particularly depicts the interactive nature of the invention whereby a user is enabled to select a detected method of interest, e.g., a writeLogFile( ) method 232 and invoke it 233. Thus as shown in FIG. 5C, the system allows the user to select which methods in the program should be executed, and invoke the method in a user-friendly GUI environment, obviating the need to write or generate test cases. Further the tool of the invention implements, upon selection by the user, utilities for displaying the context, arguments and return values 235 of the invoked method which are user selectable. In the exemplary display 230 provided in FIG. 5C, reflection is used to execute the selected method/procedure of a class (e.g., writeLogFile( ) on the object SecurityLibrary@xxxxxxxx). The reflection technique used is by calling the method invoke( ) as shown at step 120, FIG. 3.

Figure 5D:
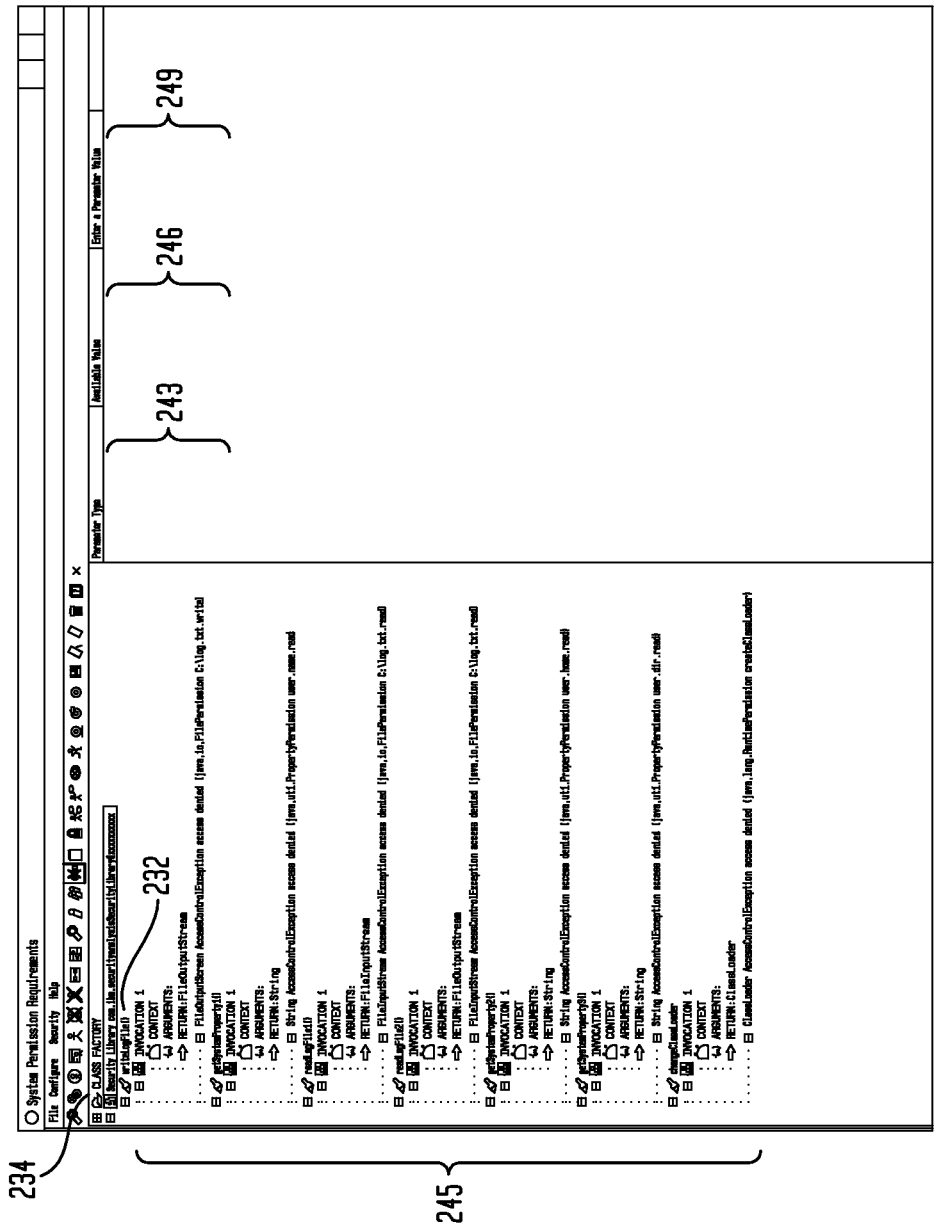

Referring back to FIG. 5B, it should be understood that selection of one or more boxes 217 associated with the methods of interest for analysis according to the invention will cause for display the selected methods as children of the given object (SecurityLibrary, for example) and permit the user to invoke them after specifying the parameters, if necessary. FIG. 5D depicts an exemplary display 240 showing all of the methods selected via the boxes 217 in FIG. 5B as children 245 shown in FIG. 5D. For a selected method, the system enables further drill down to obtain context and arguments and return values as shown in FIGS. 5C and 5D for the writeLogFile( ) method invocation 232. As further shown in FIG. 5D, the user is permitted to view the Parameter Types in fields 243, the Available Values in fields 246 and additionally, enter any Parameter Values for the selected method in entry fields 249 associated with the method of interest. The Available Values 246 are those that have been already created by invoking some methods previously. Available Values 246 compatible with the Parameter Types 243 can be chosen from a scroll down list or can be dragged and dropped in a user-friendly GUI. If the values are of primitive types (scalars) or String objects, they can be edited and entered 249. Values that are not available can be explicitly constructed via the CLASS FACTORY object 234.

Figure 5E:
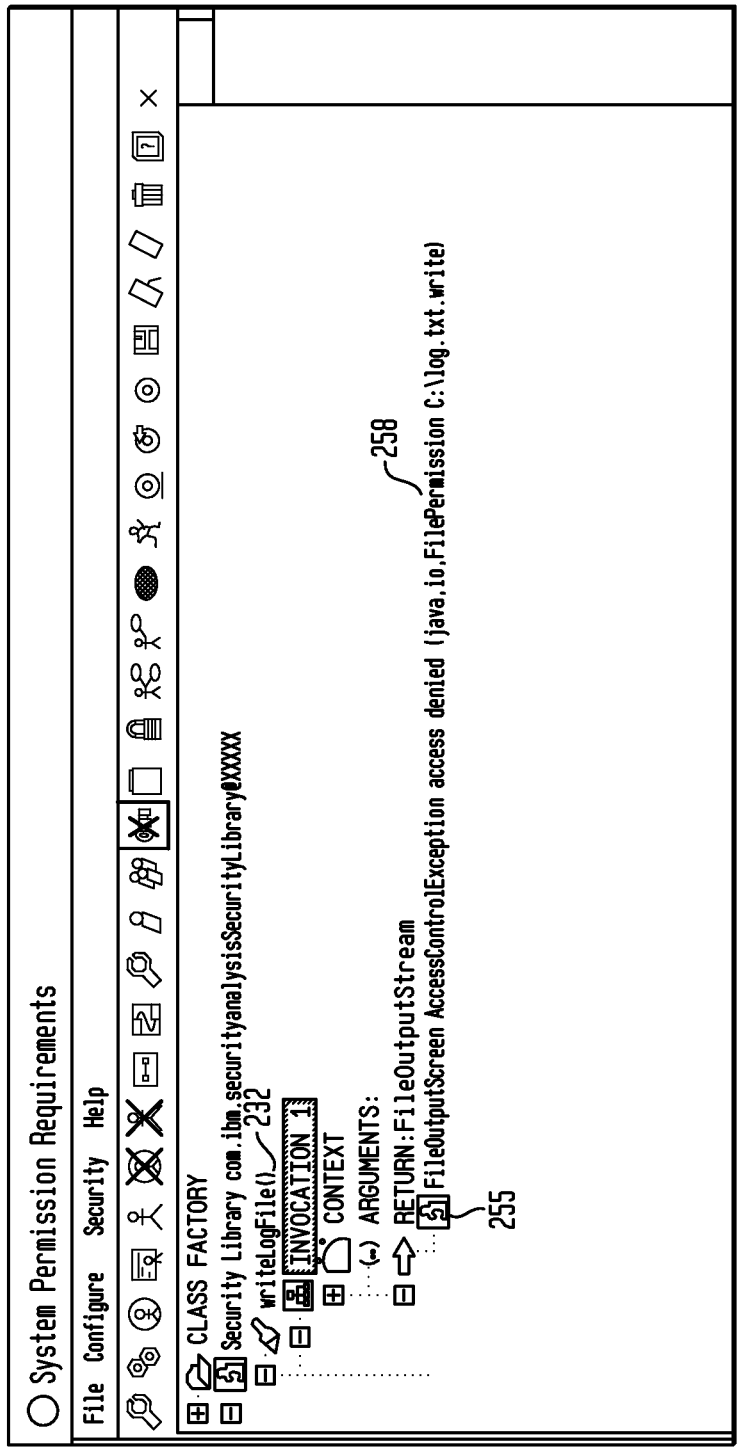

Via the interface 250, as depicted in FIG. 5E, the process of permission identification and permission granting is all mediated. As shown in FIG. 5E, the tool permits a user to immediately understand what are the permissions needed at run time, as depicted by an example icon(s) 255 representing a needed permission(s). Continuing with the example thread for the writeLogFile( ) method invocation 232, it is seen that the needed permission is ajava.io.FilePermission, "C:\log.txt", "write") 258. That is, an AccessControlException is raised as the permission java.io.FilePermssion C:\log.txt.write is required to be able to run the application. The system thus allows for automatic discovery of the security-sensitive actions attempted by a program. It is understood that, in no case, is it necessary or required to stop the program when AccessControlExceptions are raised when permissions have not been granted.

Figure 4A:
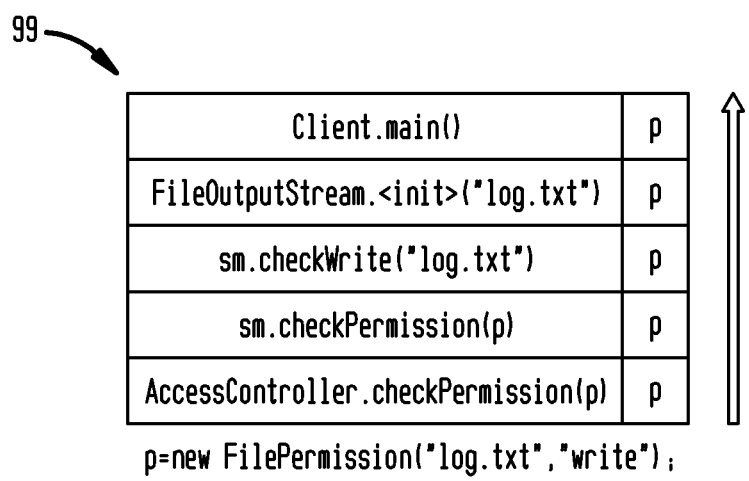
FIG. 4A depicts the stack inspection process in Java SE, when the constructor of FileOutputStream is invoked.
Figure 4B:
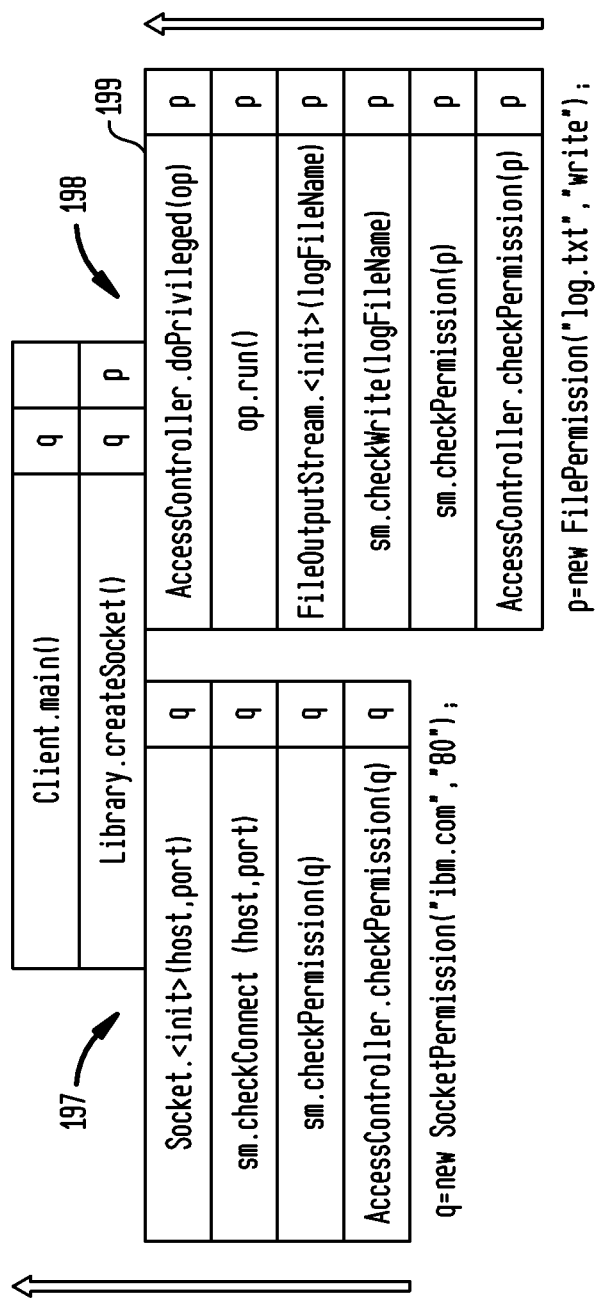
FIG. 4B depicts the stacks created in Java SE when obtaining a socket connection to a remote system.

Returning back to FIG. 3, the system tool of the invention allows the user to choose whether the permission should be granted. Thus, after an AccessControlException is raised and displayed at step 135, a printStackTrace( ) method is invoked at step 140 to perform a trace of the thread stack from which the raised exception had been determined. Details regarding thread stack inspection are described herein with respect to FIG. 4A. Then, invoking the getPermission( ) method on the AccessControlException, the system generates for display the missing permission as indicated at step 145. Continuing further, the user determines at step 150 whether the code is trusted code and it is appropriate to grant it the missing permission. If the code is determined untrustworthy, the permission will not be granted and the system will return such notice and keep the AccessControlException status in the interface at step 155. Otherwise, a Policy Update is automatically performed by the method of this invention, and accordingly, the addition of the required permission into the policy file is automatically performed, as depicted at step 160. The system automatically refreshed the policy. It is understood that, in no case, is it necessary or required to stop and restart the program for the updated policy to take effect. That is, when an AccessControlException is raised, the permission that is required is either not granted or added to the policy file (or, more in general, the policy database). Preferably, according to the invention, the user can inspect the security configuration of the program at any time, in addition to allowing for automatic modification of the program's security policy. Furthermore, it is not necessary to manually change or refresh the policy. As each invocation is executed in a separate thread, if the invocation causes a denial of service attack, its thread can be stopped without harming the execution of other methods or the execution of the system itself. The results of previous invocations can be cached (so that a security history can be seen at any time) or automatically updated, depending on a user's preference. Automatic updating of invocations allows immediate displaying of side effects caused by other invocations. Thus, if a method invocation causes the permission requirements of another method invocation to change, and the new permissions required by that other method invocation have not been granted yet, an AccessControlException will be raised in place of the previously displayed return value for that other method invocation as long as that other method invocation was configured for automatic updating.

Figure 5F:
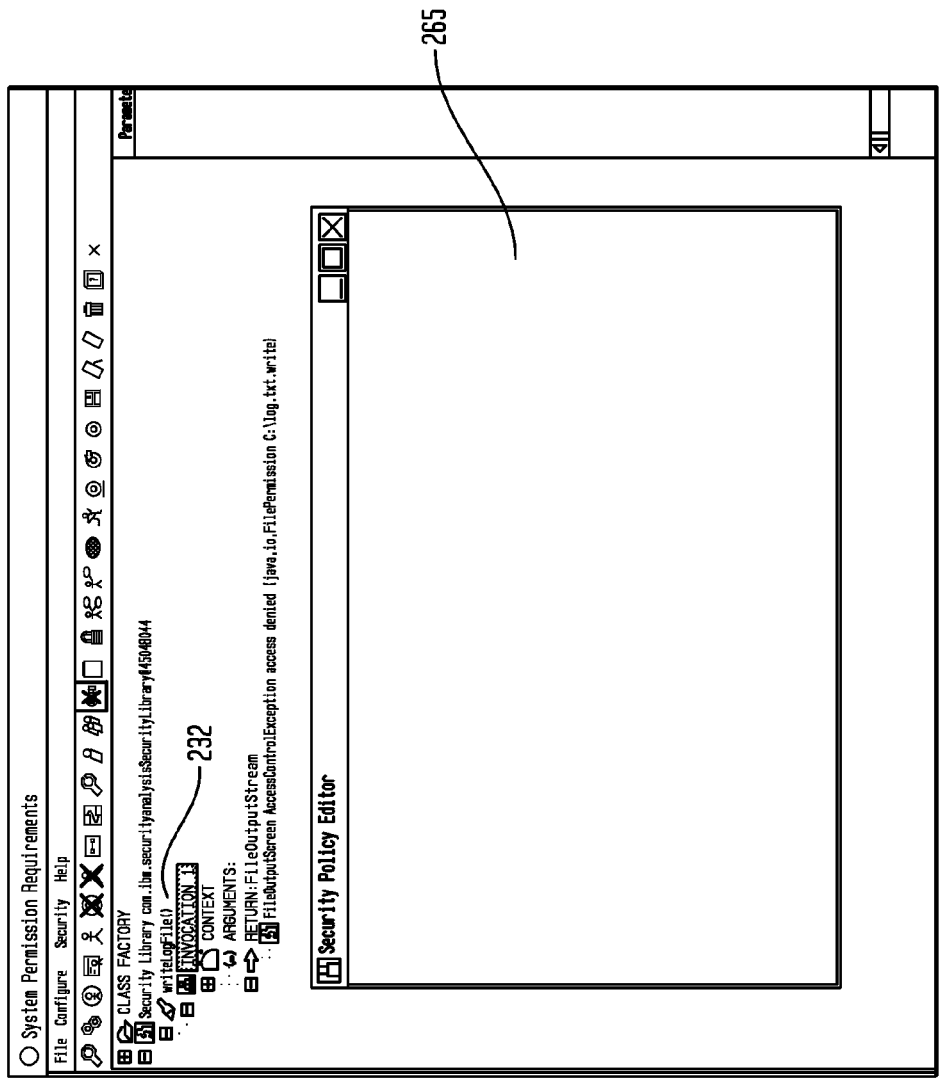

Referring to FIG. 5F, via an example display interface 260, there is depicted, in response to the thrown AccessControlException, the confirmation by the current security policy that the required permission is missing (the policy is initially empty, by default as indicated by the empty displayed dialog box 265).

Figure 5G:
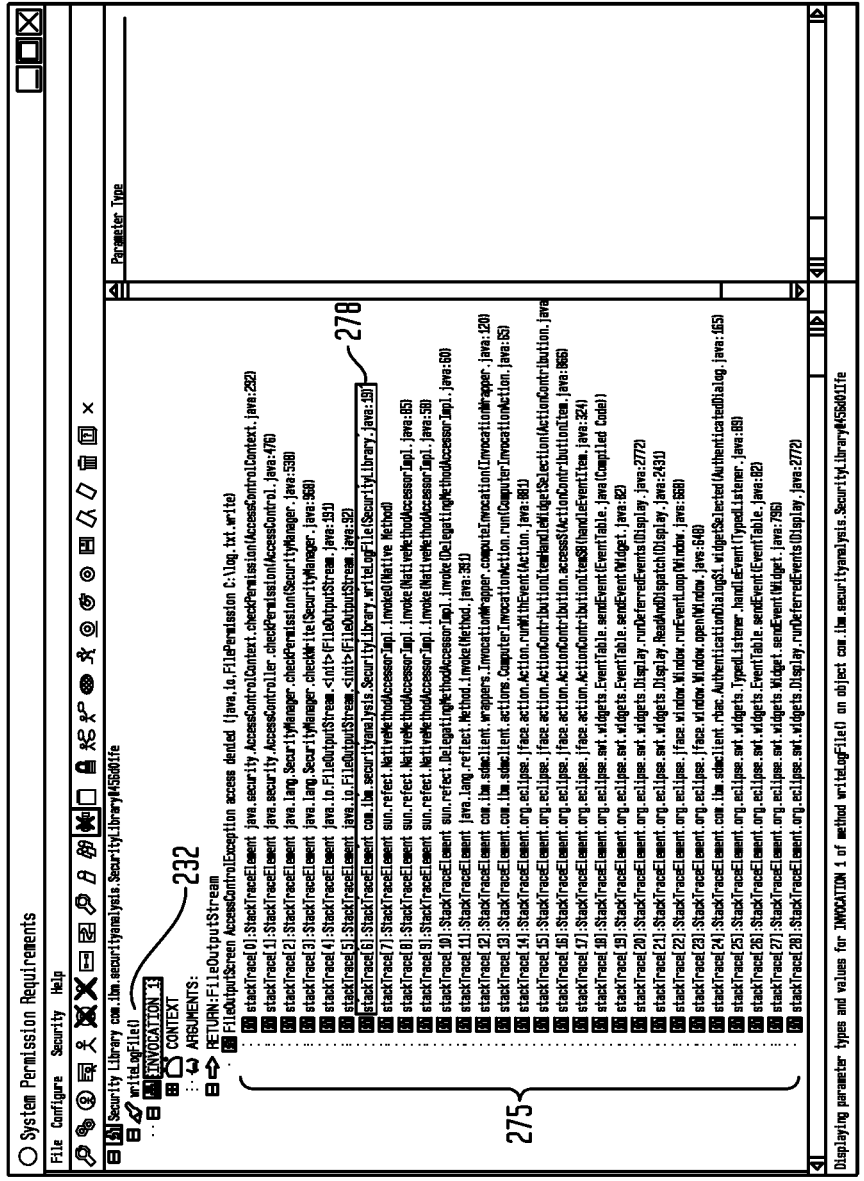

Referring to FIG. 5G, there is depicted an example display interface 270. As mentioned, in connection with inspecting the stack trace if a permission requirement is detected, the system of the invention causes for display the stack trace 275 for user inspection. The stack inspection process for Java SE has been described herein with respect to FIG. 4A. Via the example GUI 270 displayed in FIG. 5G, the system displays all the stack frames in the trace, including the stack frames where the required permission is missing. By looking at the stack trace 275, the user can infer where the required permission is missing. As seen via interface 270, the highlighted line 278 depicts where the user has identified the program point where a permission is missing. As shown in FIG. 5G, the program point includes the class name, method name, and line number. However, there may be cases where the user cannot identify and highlight the precise stack frame where the permission is missing.

Figure 5H:
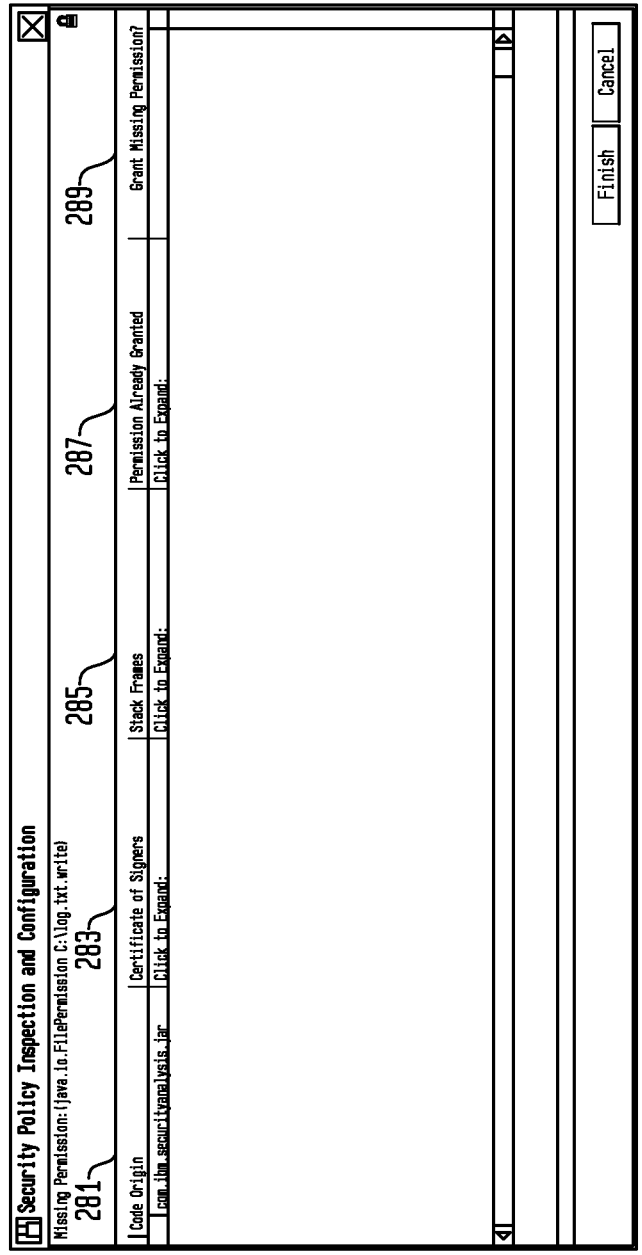
Figure 5I:
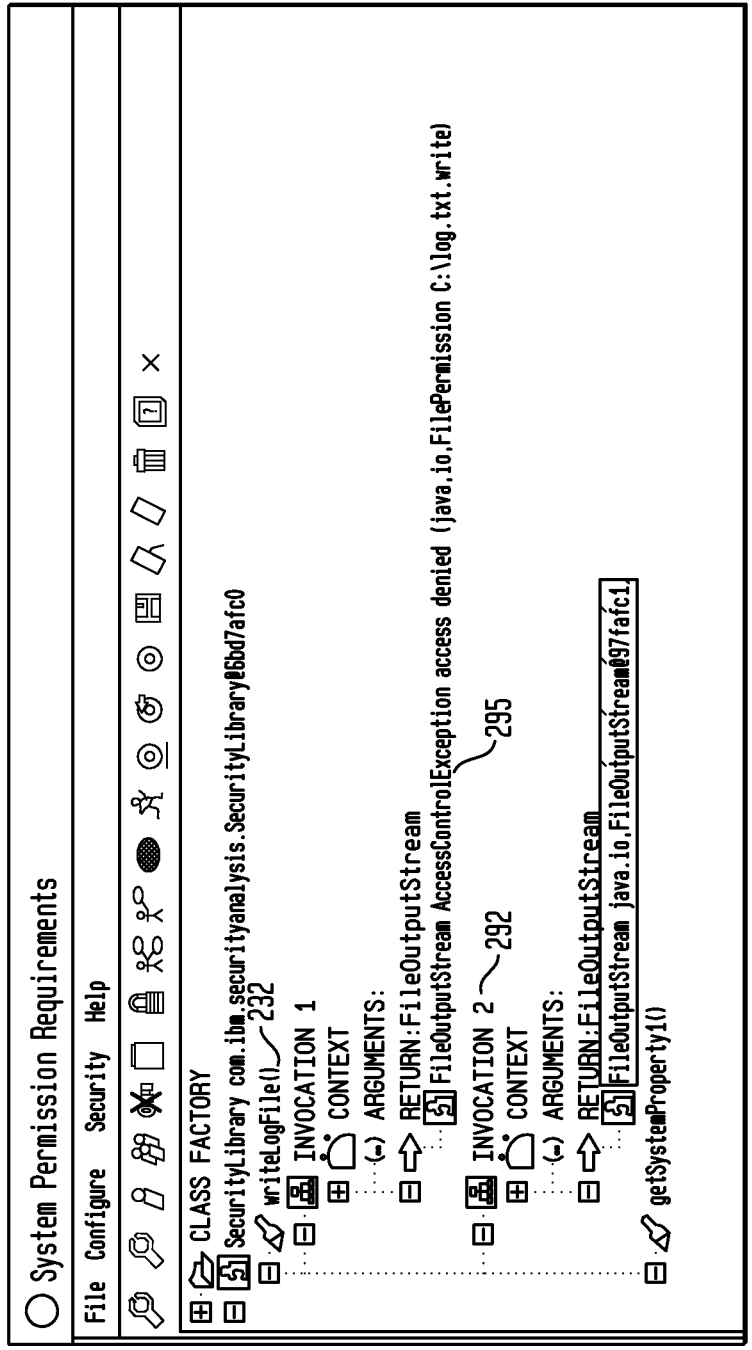
Figure 5J:
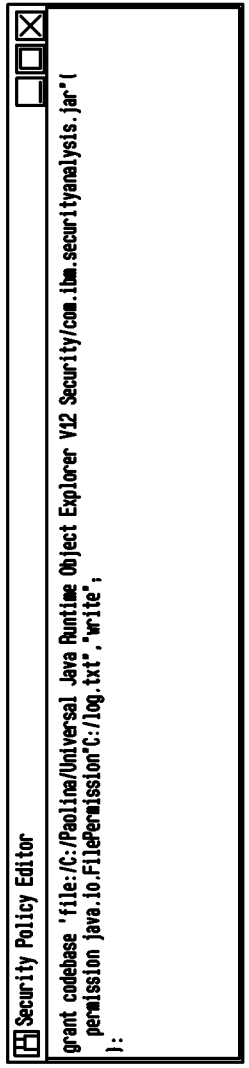
Figure 5K:
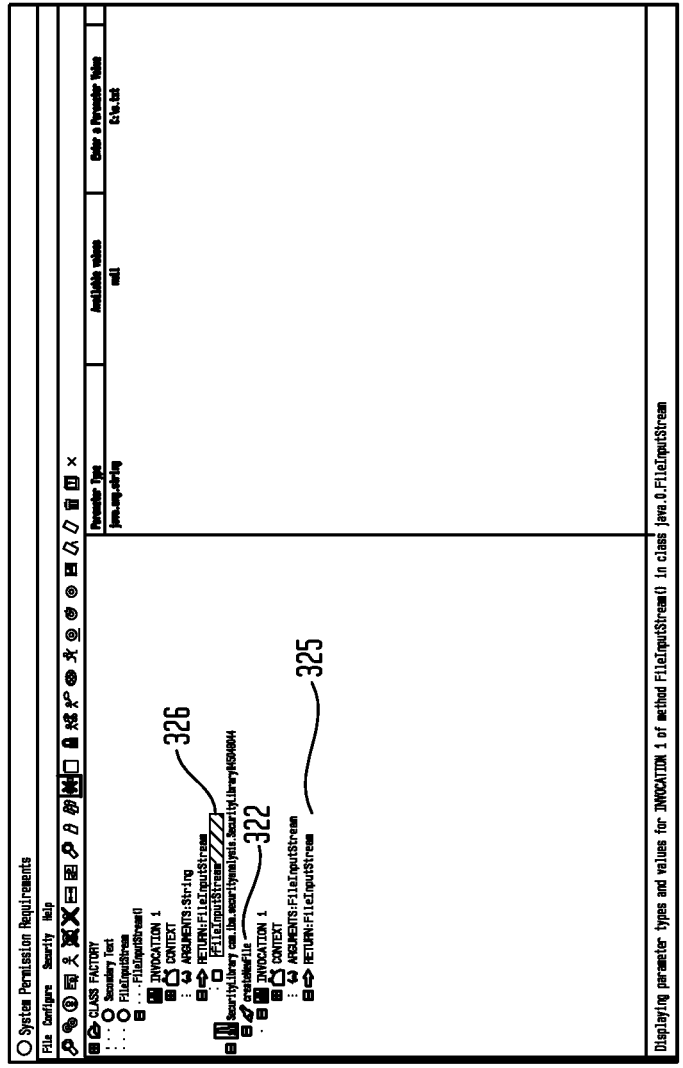
Figure 5L:
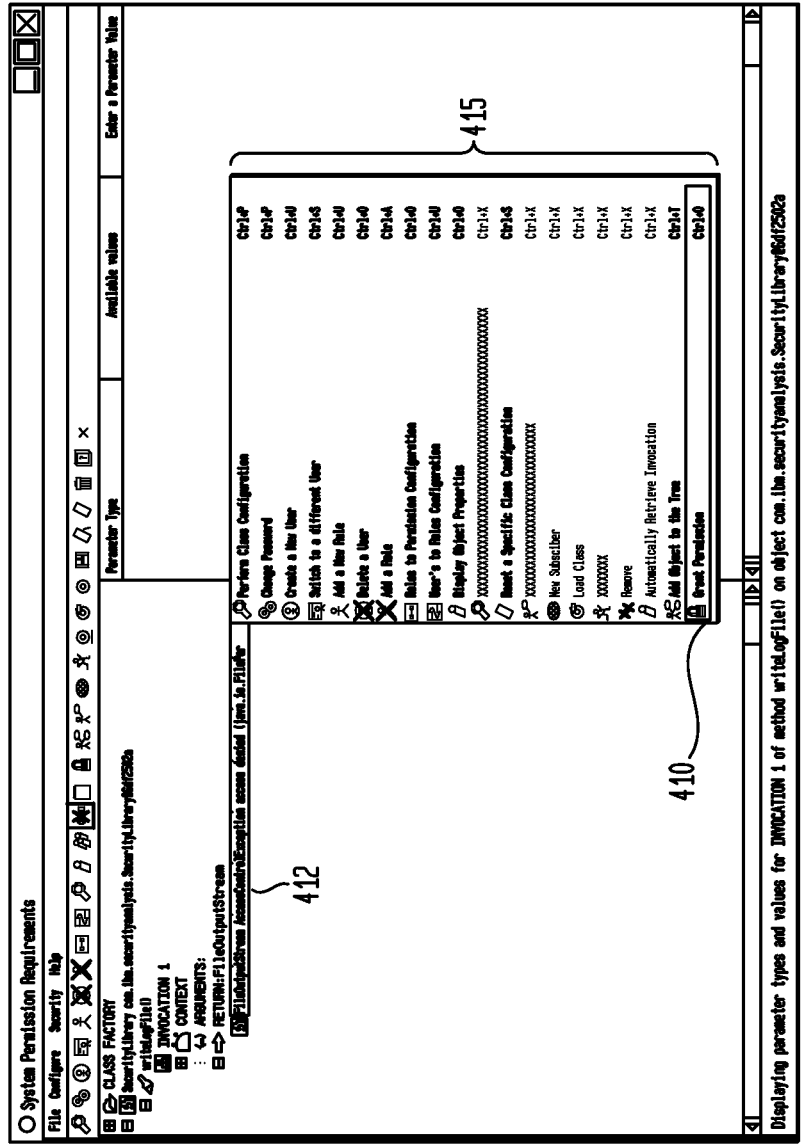

FIG. 5L illustrates an exemplary interface 400 providing display of the exemplary context menu 415 generated upon selection of the highlighted AccessControException 412. The highlighted menu item Grant Permission 410 can be selected to inspect the missing permission requirement, gather information about the code requiring it, and possibly grant that permission.

FIG. 5H illustrates the exemplary dialog box 280 generated upon selection of the Grant Permission menu item 410 highlighted item in FIG. 5L, indicating the required Permission that is missing. For the example missing Permission "java.io.FilePermssion C:\log.txt.write" shown in FIG. 5G, FIG. 5H shows the example display depicting the origin of the code 281 (i.e., the component name), the Certificates of the Signers 283 (which, when selected may be expandable to indicated the signers), the Stack Frames 285 (which, when selected may be expandable to indicated the stack frames where the required permission is missing and from which may be obtained the file name, class name, method name, and line number of the precise code location responsible for a permission requirement), the Permissions already granted 287 (which, when selected may be expandable to indicated the Permissions that have already been granted to the code) and whether the missing permission is to be granted at 289. Therefore, the identification of the stack frames where the required permission is missing is automated, in case the user was not able to infer those stack frames by inspecting the call stack 275 as indicated in FIG. 5G. The stack frames reported are those that should be wrapped in privileged code, if the developer chooses to do so. Therefore, the method of this invention automates the identification of the portions of code that should be made privileged. The recommended locations are "optimal" because closest to the boundary between the component displayed in the Code Origin field 281 and other components. The user may thus choose to see where the permission was missing and decide to grant it based on the origin of the code (for example, URL and signers), the stack frames where the authorization failure occurred, and the existing permissions already granted. The system supports component-based programs (meaning that the program is virtually divided into different portions of code), with each component of the code potentially being granted different permissions.

FIG. 5I depicts an exemplary interface display 290 providing the security history of the application under analysis which is important for methods that take parameters. If the permission is granted, the AccessControlException may not immediately disappear as indicated by the exception 295 in response to the second invocation 292 of the writeLogFile( ) method 232 as invoked in the example. There are three options for determining whether the permission granting has succeeded: 1) a new invocation is necessary (as will be described in detail in further view of FIG. 5I showing the authorization history); 2) refreshing the old invocation manually is necessary; or, 3) refreshing the old invocation automatically is necessary.

FIG. 5J depicts an exemplary interface display 300 depicting a policy file grant entry. This exemplary display 300 is provided as a result of immediately providing the changes effected by the policy editor using the proper syntax, which minimizes security problems due to syntax errors that are likely to be made in manually edited policy files. Preferably, the system updates and reapplies the security policy at any change performed by the user without the need for restarting the program.

FIG. 5K depicts an exemplary interface display 320 displaying an example in which a method createNewFile( ) 322 is used to create an object of type FileInputStream 325. Via the CLASS FACTORY object instantiator 234, the FileInputStream highlighted object 326 is instantiated. Referring back to FIG. 2, reflection is employed, according to the invention, such that a method Class.forName( ) is first loaded which returns a class. On the class returned, the getConstructors( ) method is called and for each constructor the method newInstance( ) can be called. Via the CLASS FACTORY technique, it is also possible to call any static methods of a class. The reflection technique used is as follows: the class is loaded, and on that class the method getDeclearedMethods( ) is called. For each method, the method getModifiers( ) is called and for each modifier, Modifier.isStatic( ) is called. If this method returns the boolean value "true", finally the method invoke( ) is called (FIG. 2).

It is seen from the foregoing description and exemplary FIGS. 5A-5L, that the process of permission identification and permission granting is all mediated by the GUI. Thus, what is presented is a run-time authorization requirement discovery tool that allows users to automatically: 1) discover the security-sensitive actions attempted by a program; 2) detect the program's authorization requirements; 3) detect the program's privileged code requirements; and, 4) configure and inspect the security policy of the program. Preferably, these actions are performed without having to: write or generate test cases; manually edit the policy; compromise the integrity of the underlying computer; and, without having to restart the application at every permission requirement finding or policy change. Thus, the level of trust of a program under analysis may be customized without having to change the security configuration of other components. Moreover, in view of the description and exemplary FIGS. 5A-5L, a user can automatically (not manually) enable and disable the system security, which allows the execution of the program in a restricted environment (sandbox) independent of the particular security subsystem. If the security subsystem configuration changes, authorization requirements will change accordingly. This invention is flexible and adapts itself to different security policies and it detects the new authorization requirements automatically.

The system, method and computer program product of the invention thus allows for automatic discovery of the security-sensitive actions attempted by a program. In addition the system allows detecting the different permission and privileged-code requirements that can arise when invoking methods with different parameters. As shown here, detecting a missing permission or a privileged-code requirement is immediate. The authorization requirement for the discovery and configuration is interactive. Also, as opposed to a static analysis approach, the system of the invention is not conservative, since the system does dynamic analysis. That is, if a permission requirement is reported, that permission is really needed. Furthermore, as opposed to a static analysis approach, the system of this invention is not limited by the presence of native methods and reflection, which when not modeled make a static analysis unsound.

The system of this invention allows invoking methods of the program under analysis in a "sandbox" environment (the program is not allowed to perform security-sensitive operations unless it is explicitly granted the necessary permissions). If any of the methods being invoked attempts to perform an operation that requires a permission that has not been granted, a SecurityException is generated. The system catches the exception and reports it via the user interface as described herein.

Advantageously, the system of the invention may be integrated within and operate in conjunction with a static analysis permission finder such as IBM's Security Workbench Development Environment for Java (SWORD4J) tool (e.g., released version 1.0.45 of IBM's SWORD4J).

Figure 6:
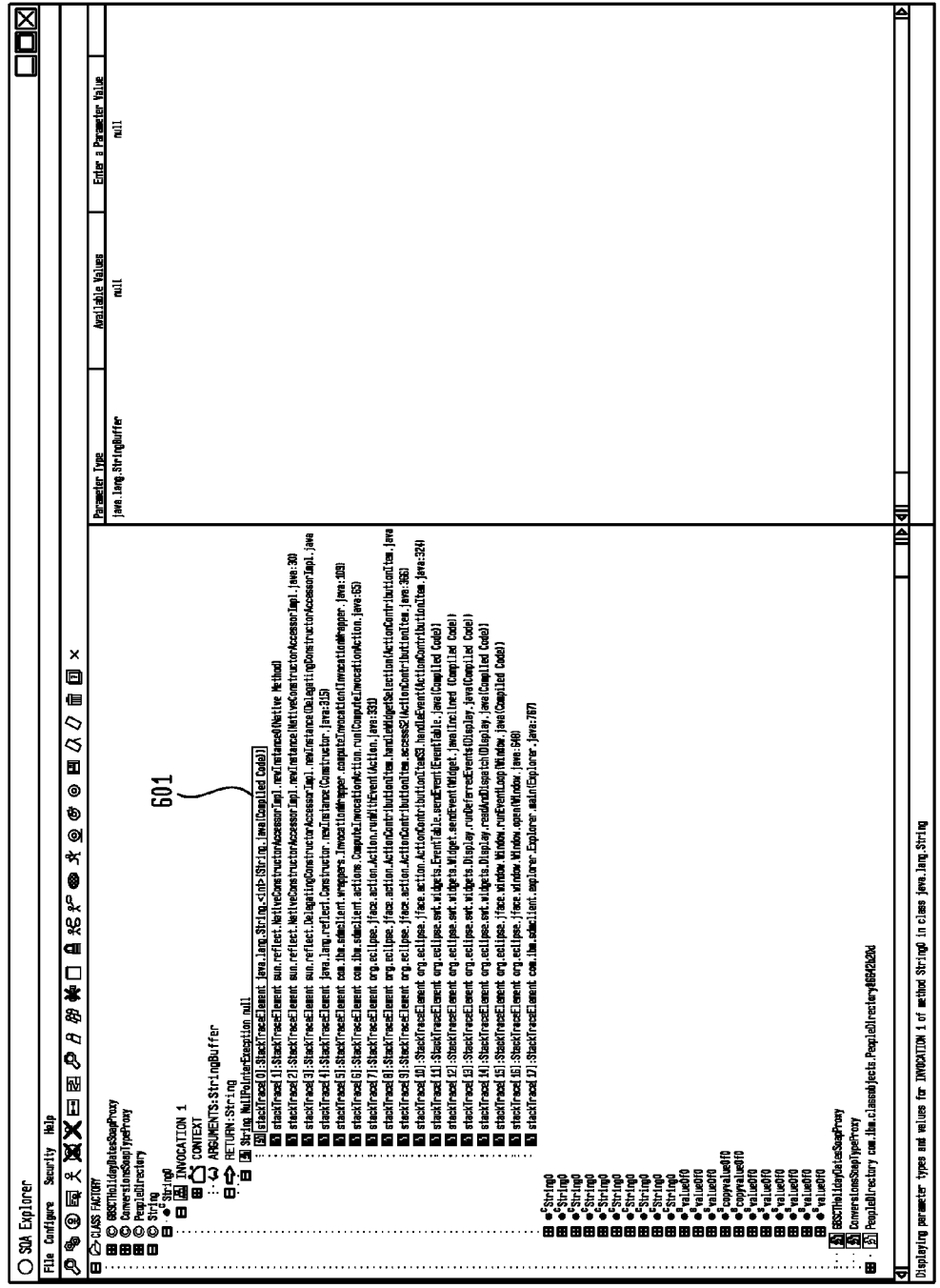
FIG. 6 depicts an example user interface display demonstrating how the tool can be used more generally to detects problems and exceptions in code, and to validate results obtained by executing other analysis on that code (for example, static analysis or code inspection).

The system of this invention can be used also for non-security-related problem finding and in conjunction with other non-security-related analyses. For example, FIG. 6 shows an exemplary display in which the code being tested generates a NullPointerException 601. The system of this invention can be used to identify that the code has a problem causing the NullPointerException, inspect the stack trace associated with the NullPointerException, and identify the reason for the NullPointerException.

The system of this invention can be used in conjunction with other analyses, such as code inspection. For example, a code reviewer may suspect that a NullPointerException or an AccessControlException will be generated at run time and can use the system of this invention to verify if the Exception will actually be raised.

The present invention has been described with reference to diagrams of methods, apparatus (systems) and computer program products according to embodiments of the invention. It will be understood that each diagram can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified herein.

These computer program instructions may also be stored in a computer-readable memory that can direct a computer or other programmable data processing apparatus to function in a particular manner, such that the instructions stored in the computer-readable memory produce an article of manufacture including instruction means which implement the functions specified herein.

The computer program instructions may also be loaded onto a computer-readable or other programmable data processing apparatus to cause a series of operational steps to be performed on the computer or other programmable apparatus to produce a computer implemented process such that the instructions which execute on the computer or other programmable apparatus provide steps for implementing the functions specified herein.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. A method for detecting and verifying security authorization and privileged-code requirements in a run-time execution environment in which a software program is executing, said method comprising:
   implementing reflection objects for—making reflection calls to one or more classes of objects in said executing program to identify from said classes and objects all methods where authorization failures may occur in response to the program's attempted access of resources requiring authorizations as enforced by a particular security subsystem, said methods including methods of said one or more classes that take object parameters having different permission and privileged-code requirements that can arise when the methods are invoked with parameters to be passed determined at run-time,
   providing a listing of all said identified class methods for display via a user interface;
   implementing reflection objects to enable a user, via said interface, to select a displayed method, determine one or more types and number of the parameters that need to be passed to said method being invoked, create one or more customized object parameters and pass customized object parameters to said selected displayed method and invoke said method in real-time in a restricted execution environment where said program is prevented from performing security-sensitive operations;
   in response to invoking said method, determining whether a security exception is raised if a required authorization has not been expressly granted, and, reporting existence of said security exception via said user interface;
   enabling a user to select, via said user interface, the security exception; and, for each required authorization that should be granted, granting, by said user, the necessary permission via said user interface, and,
   automatically updating a security policy in response to a user granting a particular authorization without the need for restarting execution of the program,
   wherein local system, fine-grained access of resources requiring authorization is provided.

2. The method as claimed in claim 1, wherein an authorization includes one or more of the following: a permission, a role.

3. The method as claimed in claim 1, wherein said local-system, fine-grained access is provided independent of a particular security subsystem implemented.

4. The method as claimed in claim 1, wherein said reflection objects includes Java reflection objects that enables instantiation of selected objects of the program.

5. The method as claimed in claim 4, wherein said methods are listed as a hierarchical stack of method invocations.

6. The method as claimed in claim 4, wherein, in response to invoking said method, generating a security exception if a required authorization has not been expressly granted, said method further comprising:
   reporting existence of said security exception via said user interface, and,
   enabling user selection of the security exception via said user interface; and,
   generating information for display concerning said required authorization via said user interface.

7. The method as claimed in claim 6, wherein said generating information concerning a required authorization comprises:
   invoking a security function that performs a stack trace for determining all callers on a stack tracking program execution; and,
   determining which stack frames do not have the required authorization; and,
   generating information about the code that has not been granted the authorization.

8. The method as claimed in claim 7, wherein said information generated about the code includes one or more of: a component name, a class name, a method name, a line number, a code origin, and those authorizations that have already been granted to the program's code.

9. The method as claimed in claim 4, wherein said method in executed in a separate thread, isolated from said execution environment.

10. The method as claimed in claim 1, wherein said program is one selected from the group comprising: a Java application, a component-based program; a C++ application, a C# application, a Web service application program, a Service Oriented Application (SOA) application, a C application, a Microsoft .NET Common Language Runtime (CLR) application, an application developed using a scripting language.

11. A program storage device tangibly embodying software instructions which are adapted to be executed by a computing device to perform a method of verifying security authorizations in a run-time execution environment in which a software program is executing according to claim 1.

12. A run-time authorization requirement discovery tool for a computing device executing software programs requiring security authorizations comprising:
- a memory storage device;
- a programmed processor unit in communication with said memory storage device and configured to:
- provide a restricted execution environment where said program is prevented from performing security-sensitive operations;
- implement reflection objects for making reflection calls to one or more classes of objects in said executing program to identify from said classes and objects all methods in said executing program where authorization failures may occur in response to the program's attempt to access resources requiring permissions as enforced by a particular security subsystem, said methods including methods of said class that take object parameters having different permission and privileged-code requirements that can arise when the methods are invoked with parameters to be passed determined at run-time;
- provide a listing of all said identified methods for display via a user interface device;
- select, by a user, a displayed method via said interface device;
- implementing reflection objects to create customized object parameters that are passed to said selected displayed method and invoking said method in real-time in said restricted execution environment;
- determine, responsive to invoking said method, whether a security exception is raised if a required authorization has not been expressly granted, and, reporting existence of said security exception via said user interface device,
- enable a user to select, via said user interface, the security exception; and,
- enable said user to grant, via said user interface, for each required authorization that should be granted, the necessary permission, and,
- automatically update a security policy in response to a user granting a particular authorization without the need for restarting execution of the program,
- wherein local system, fine-grained access of resources requiring permissions is provided.

13. The authorization requirement discovery tool as claimed in claim 12, wherein said local-system, fine-grained access is provided independent of a particular security subsystem implemented.

14. The authorization requirement discovery tool as claimed in claim 12, wherein said reflection objects includes one or more Java reflection objects that enables instantiation of selected objects of the program.

15. The authorization requirement discovery tool as claimed in claim 12, wherein said methods are listed as a hierarchical stack of method invocations.

16. The authorization requirement discovery tool as claimed in claim 14, wherein, in response to invoking said method, said execution environment generating a security exception if a required authorization has not been expressly granted, said processor device further:
- reporting existence of said security exception via said user interface;
- enabling user selection of the security exception via said user interface; and,
- generating information for display concerning said required authorization via said user interface.

17. The authorization requirement discovery tool as claimed in claim 16, wherein said generating information concerning a required authorization comprises:
- invoking a security function that performs a stack trace for determining all callers on a stack tracking program execution; and,
- determining which stack frames do not have the required authorization; and,
- generating information about the code that has not been granted the authorization.

18. The authorization requirement discovery tool as claimed in claim 17, wherein said information generated about the code includes one or more of: a component name, a file name, a class name, a method name, a line number, a code origin, and those authorizations that have already been granted to the program's code.

19. The authorization requirement discovery tool as claimed in claim 14, wherein said method in executed in a separate thread, isolated from said execution environment.

20. The authorization requirement discovery tool as claimed in claim 12, wherein said executing program is one selected from the group comprising: a Java application, a component-based program; a C++ application, a C application, a Microsoft .NET Common Language Runtime (CLR) application, a C# program, a Service Oriented Architecture (SOA) application, a Web service application program, an application written in a scripting language.

21. A system for providing real-time software authorization access to restricted resources by a computer program, said system comprising:
- a memory storage device;
- a programmed processor in communication with said memory storage device and configured for performing a method comprising:
- enabling program execution in a restricted execution environment;
- displaying, via a display interface, one or more class components of said computer program,
- selecting, by a user via said display interface, a class;
- determining, using reflection objects applied to said user selected class, all methods of said class, one or more said methods subject to authorization requirements;
- displaying a list of all said determined methods on a user display interface device;
- selecting, by said user via said display interface, a method of said class subject to said authorization requirement;
- implementing reflection objects to automatically determine one or more types and number of the parameters that need to be passed to said method being invoked and create customized object parameters that are passed to said selected displayed method;
- invoking said selected method in said restricted execution environment;
- automatically determining, as a result of said invoking said method, one or more program points of said executing program where a required authorization is missing;
- generating, via said display interface, a stack trace for determining all callers on a stack in response to determining a missing authorization, said stack trace indicating one or more program points requiring a missing authorization, a program point including a program component name, a file name, a class name, a method name, file name and a file line number;

selecting, by said user via said display interface, a program point requiring a missing authorization;

granting, by said user via said display interface, one or more said required authorizations, and, automatically updating a security policy in response to a user granting a particular authorization without the need for restarting execution of the program, wherein said granting of authorizations is performed without terminating execution of the program.

22. The system as claimed in claim 21, further comprising: generating for display information about said code having the missing authorization, said information comprising: a URL from which the code is originated, the certificates of entities that signed that code, authentication information of the user or service executing the program, and the authorizations already granted to the program, user, and service.

23. A method for providing real-time software authorization access to restricted resources by a computer program, said method comprising:

enabling program execution in a restricted execution environment;

displaying, via a display interface, one or more class components of said computer program, selecting, by a user via said display interface, a class;

determining, using reflection calls applied to said user selected class, all methods of said class via said display interface, one or more said methods subject to authorization requirements;

displaying a list of all said determined methods on a user display interface device;

selecting, by said user via said display interface, a method of said class subject to said authorization requirement;

implementing reflection objects to automatically determine one or more types and number of the parameters that need to be passed to said method being invoked and create customized object parameters that are passed to said selected displayed method;

invoking said selected method in said restricted execution environment;

automatically determining, as a result of invoking said method, one or more program points of said executing program where a required authorization is missing;

generating, via said display interface, a stack trace for determining all callers on a stack in response to determining a missing authorization, said stack trace indicating one or more program points requiring a missing authorization, a program point including a program component name, a file name, a class name, a method name, file name and a file line number;

selecting, by said user via said display interface, a program point requiring a missing authorization;

granting, by said user via said display interface, one or more said required authorizations, and, automatically updating a security policy in response to a user granting a particular authorization without the need for restarting execution of the program, wherein said granting of authorizations is performed without terminating execution of the program.

24. A method for detecting problems in an executing software program comprising:

enabling program execution in a restricted execution environment, which prevents the underlying system from becoming corrupted if the program being executed is malicious or performs incorrectly;

automatically determining, using reflection objects applied to said software program, one or more program points of said executing program wherein an exception is raised indicating a potential problem in said executing software;

displaying a list of said one or more program points on a user display interface device;

selecting, by a user, via a display device, a program point, said displayed program point including a method to be invoked by said software program;

implementing reflection objects to automatically determine of said determine one or more types and number of the parameters that need to be passed to said method being invoked and create customized object parameters that are passed to said selected displayed method;

initiating the execution of the selected program point without causing the system to stop its own execution if an exception is raised indicating a problem with the software;

enabling a user to inspect, via a display device, a stack trace generated in response to said selected program point, said stack trace provided via said display means to indicate said raised exception for said potential problem in said executing software, said problem indicating a missing permission required for performing an instantiated object's method; and detecting, by said user via said display device, the optimal locations where code may be inserted to correct the indicated problem, and, automatically updating a security policy in response to a user granting a particular authorization without the need for restarting execution of the program.

25. The method of claim 24, wherein a program point location includes one or more of: a component name, a class name, a method name, a file name, and a line number.

26. The method of claim 25, wherein an indicated program point is provided as a result of a static analysis performed by a static analysis tool for detecting problems in said program, said method verifying an analysis performed on said software program by said static analysis tool.

27. The method of claim 25, wherein an indicated program point is provided as a result of a static analysis performed by a user inspecting said software for detecting a problem in said program, said method verifying said user's program inspection analysis results.

28. A method for verifying analysis results of software programs, said analysis results being obtained as a result of a previously performed software analysis technique, said method comprising:

enabling program execution in a restricted execution environment, which prevents the underlying system from becoming corrupted if the program being analyzed is malicious or performs incorrectly;

determining from said previously obtained analysis results, one or more program points of said executing program indicating a missing permission required for performing an instantiated object's method;

displaying a list of said one or more program points on a user display interface device;

selecting, by a user, a program point, said displayed program point including a method to be invoked by said software program;

implementing reflection objects to automatically determine of said determine one or more types and number of the parameters that need to be passed to said method being invoked and create customized object parameters that are passed to said selected displayed method;

initiating the execution of a selected program point without causing the system to stop its own execution if an exception is raised indicating said potential problem with the software;

inspecting, by said user via a display device, a stack trace generated in response to said selected program point, said stack trace provided via said display means to indicate said problem in said executing software; and verifying, by said user via said display means, whether the potential problem was correctly indicated by said previously performed software analysis technique.

29. The method of claim 28, wherein said previously performed software analysis technique comprises a static analysis performed by a static analysis tool for detecting problems in said program.

30. The method of claim 28, wherein said previously performed software analysis technique comprises an analysis performed by a user inspecting said software for detecting a problem in said program.

31. The system as claimed in claim 21, wherein responsive to determining, as a result of invoking said method, one or more program points of said executing program having a required authorization missing, said method further comprising: raising an access control exception, said stack trace generated in response to said raised exception.

32. The method as claimed in claim 23, wherein responsive to determining, as a result of invoking said method, one or more program points of said executing program having a required authorization missing, said method further comprising: raising an access control exception, said stack trace generated in response to said raised exception.

33. The system as claimed in claim 21, wherein, for each authorization to be granted, enabling a user to make portions of program code privileged without exposing the program to other security risks.

34. The method as claimed in claim 23, wherein, for each authorization to be granted, enabling a user to make portions of program code privileged without exposing the program to other security risks.

* * * * *